(12) United States Patent
Steyn et al.

(10) Patent No.: US 7,178,767 B2
(45) Date of Patent: Feb. 20, 2007

(54) MULTI-LEGGED EQUIPMENT SUPPORT FOR CAMERAS, SPOTTING TELESCOPES AND THE LIKE AND JAM-PLATE LOCK FOR SAME

(75) Inventors: Jasper L. Steyn, Waterkloof Ridge (ZA); Daniel K. Moon, Wilmington, DE (US); Brian B. Conaty, Wilmington, DE (US); Thomas A. Greenwood, Tigard, OR (US); Ingrid Shao-Ying Huang, Sugar Land, TX (US); Philip G. Kong, West Hempstead, NY (US); James I. Meyer, Spearfish, SD (US); Prabhat K. Sinha, Budh Marg (IN)

(73) Assignee: Massachusetts Institute of Technology, Cambridge, MA (US)

( * ) Notice: Subject to any disclaimer, the term of this patent is extended or adjusted under 35 U.S.C. 154(b) by 226 days.

(21) Appl. No.: 10/477,063

(22) PCT Filed: May 9, 2002

(86) PCT No.: PCT/US02/14714

§ 371 (c)(1),
(2), (4) Date: Jun. 4, 2004

(87) PCT Pub. No.: WO02/090819

PCT Pub. Date: Nov. 14, 2002

(65) Prior Publication Data

US 2004/0206879 A1 Oct. 21, 2004

Related U.S. Application Data

(60) Provisional application No. 60/290,002, filed on May 10, 2001.

(51) Int. Cl.
F16M 11/00 (2006.01)

(52) U.S. Cl. .................. 248/163.1; 248/187.1; 248/440

(58) Field of Classification Search ............. 248/163.2, 248/163.1, 168, 170, 173, 187.1; 396/5, 396/12, 419, 428; 352/243
See application file for complete search history.

(56) References Cited

U.S. PATENT DOCUMENTS 505,797 A * 9/1893 Wastall .......................... 5/128

(Continued)

Primary Examiner—Ramon O Ramirez
(74) Attorney, Agent, or Firm—Steven J. Weissburg

(57) ABSTRACT

A multi-leg equipment stand has a unitary user interface. All legs can be adjusted simultaneously, or, an individual leg can be adjusted, by distinct motions of the interface. A collar is near to an equipment support shoulder. Rotation around a vertical axis releases all legs. For a tripod, tilting the collar in one direction releases only one of three legs. The tilt may be toward the leg to be moved. The legs have adjacent, telescoping components. A control rod extends from the collar, through the hollow interior of the upper component, to a jam-plate, at the lower end of the upper component. The plate jams between an inside of the lower component, and an inside of the upper component. The rod passes through the jam-plate. Pushing the rod tilts the jam-plate, freeing it from jamming. A spring returns it to jamming if released. For each leg, the collar underside has a two level cam recess. The rods each have a cam follower surface at their shoulder end. Rotating the collar pushes each of the rods, releasing all jam-plates. Returning the collar allows the rods to move back, under influence of springs. Tilting the collar in any one of the leg directions pushes only one of the rods, tilting and releasing one jam-plate. The rod and jam-plate may be used with a single leg. The user interface can be used with two or more legs. The jam-plate may lock against a bushing, rather than directly against the upper component. Rather than rods that are pushed, cables can be pulled. Three component legs can also be activated using jam-plates.

53 Claims, 13 Drawing Sheets

U.S. PATENT DOCUMENTS

| | | | |
|---|---|---|---|
| 955,140 A * | 4/1910 | Oronk | 126/30 |
| 1,048,143 A | 12/1912 | Franke | |
| 2,787,485 A | 4/1957 | Frisell | |
| 3,807,574 A | 4/1974 | Lanza | |
| 3,976,016 A | 8/1976 | Longbottom | |
| 4,113,222 A | 9/1978 | Frinzel | |
| 4,318,526 A | 3/1982 | Werner | |
| 4,579,436 A * | 4/1986 | Jaumann | 248/163.1 |
| 4,601,246 A | 7/1986 | Damico | |
| 4,840,338 A | 6/1989 | O'Connor | |
| 4,892,279 A | 1/1990 | Lafferty et al. | |
| 5,016,846 A | 5/1991 | Solomon | |
| 5,320,316 A * | 6/1994 | Baker | 248/163.1 |
| 5,794,899 A * | 8/1998 | Tamllos | 248/166 |
| 5,823,491 A | 10/1998 | Lindsay et al. | |
| 6,152,638 A | 11/2000 | Lindsay | |
| 6,164,843 A * | 12/2000 | Battocchio | 396/419 |
| 6,213,434 B1 | 4/2001 | Reichanadter | |
| 6,254,043 B1 * | 7/2001 | Schwarzler | 248/163.1 |
| 6,286,795 B1 | 9/2001 | Johnson | |
| 6,454,228 B1 | 9/2002 | Bosnakovic | |
| 2001/0048059 A1 * | 12/2001 | Jones, II | 248/461 |

* cited by examiner

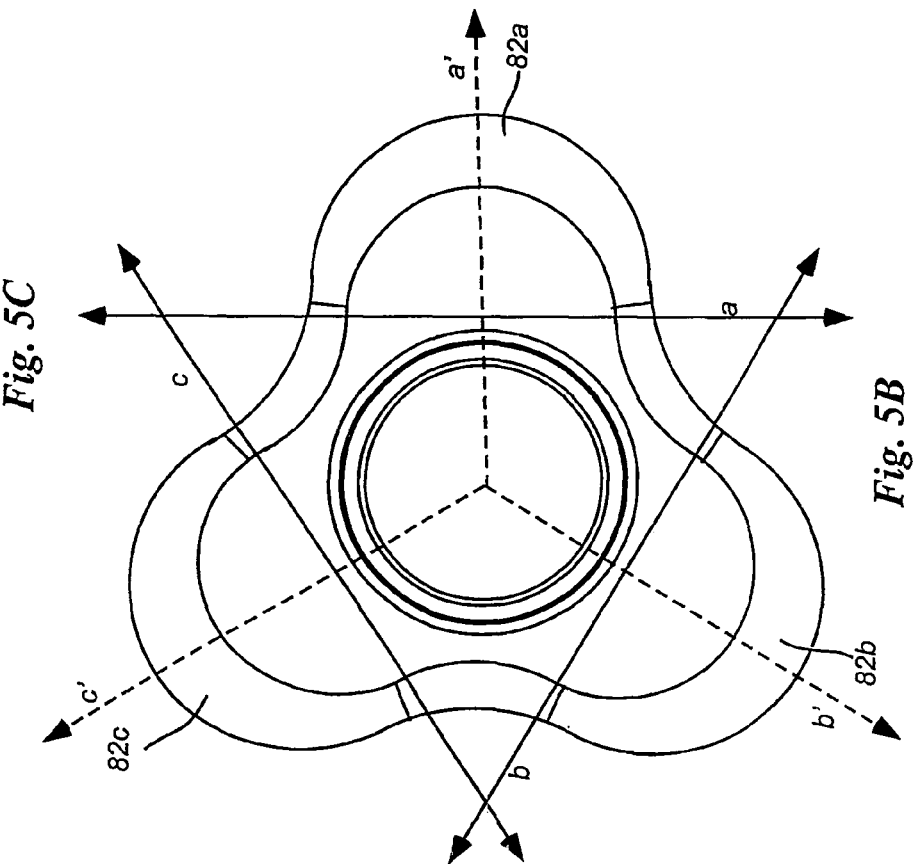
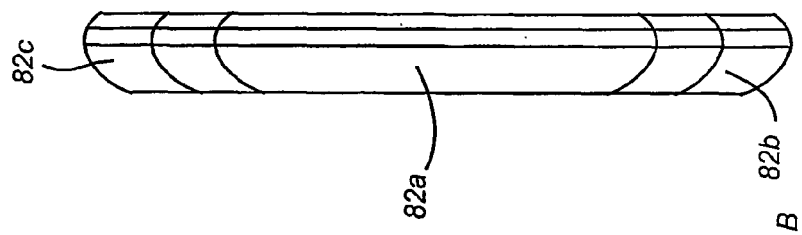
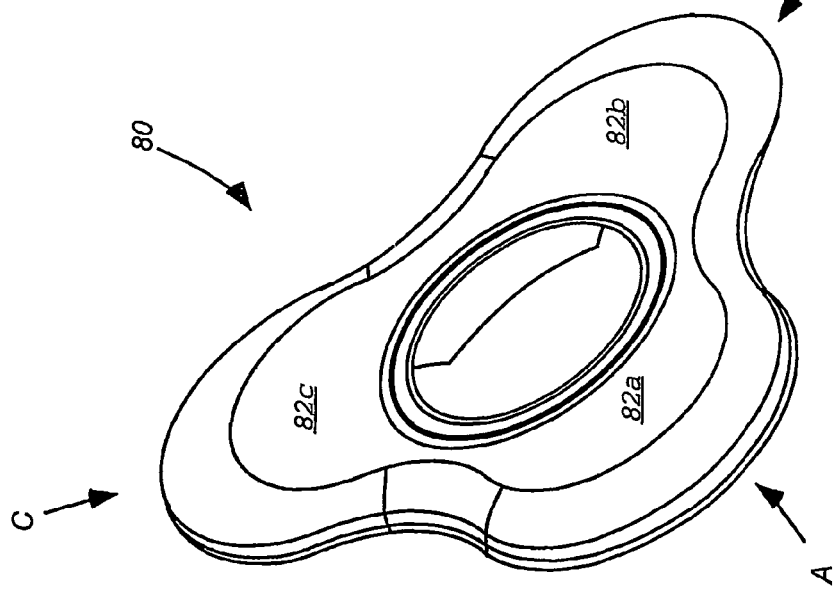

MULTI-LEGGED EQUIPMENT SUPPORT FOR CAMERAS, SPOTTING TELESCOPES AND THE LIKE AND JAM-PLATE LOCK FOR SAME

CROSS-REFERENCE OF RELATED APPLICATIONS

This is a 35 U.S.C. § 371 national stage of co-pending international application PCT/US02/14714, filed on 9 May 2002, which itself claims priority and the benefit of the filing date under 35 U.S.C. 119(e) to U.S. Provisional application No. 60/290,002, which was filed on 10 May 2001. The benefit of the filing date of co-pending international application PCT/US02/14714 is also claimed under 35 U.S.C. § 120.

SUMMARY

One invention disclosed herein is a multi-legged equipment stand. It comprises a shoulder bracket and coupled to the shoulder bracket, a plurality of telescoping, elongated legs. Each leg has an uppermost elongated component and a lower elongated component. The uppermost and lower components are elongated along an axis of elongation, the uppermost elongated component being translationally fixed relative to the shoulder bracket. The lower elongated component is translatable relative to the shoulder bracket and the uppermost component, along the axis of elongation. The uppermost component has a shoulder end, and a ground end, as does the lower component. The shoulder end of the uppermost and lower components are located nearer to the shoulder bracket than the ground end of the respective components. For each pair of uppermost and lower components of a leg, a releasable lock engages both the uppermost and lower components. The lock is movable from a locking configuration, which contacts both of the uppermost and lower components, to a nonlocking configuration, in which the components are movable relative to each other under the influence of a force less than the force of gravity applied to the lower component. Coupled to each of the lock mechanisms, is a control rod, which extends from the lock plate, along the uppermost elongated component to adjacent the shoulder bracket, terminating in a cam follower surface. The rod is coupled to the lock mechanism to selectively lock or unlock the lock mechanism if the control rod is moved. There is also a user interface collar, supported by the shoulder bracket, adjacent the cam follower surfaces of the plurality of control rods. The collar comprises, for each of the control surfaces, a mating cam recess surface. There is a couple between the shoulder bracket and the user interface collar, which partially restrains the collar such that: a unified control motion of the collar relative to the support simultaneously moves all of the control rods so that all of the lower components are free to translate relative to the respective uppermost components; and a first single control motion of the collar relative to the shoulder bracket moves only a first one of the control rods so that a corresponding one of the lower components is free to translate relative to its respective uppermost component, while simultaneously, all others of the lower components are unaffected with respect to translating relative to their respective uppermost components. The collar is further restrained such that a second single control motion of the collar relative to the shoulder bracket moves only a different, second one of the control rods so that a corresponding one of the lower components is free to translate relative to the respective uppermost component, while simultaneously, all others of the lower components are unaffected with respect to translating relative to their respective uppermost components.

The number of legs can be two, three, or more.

The lock mechanism can be a spring-loaded jam-plate. If so, the uppermost and lower elongated leg components are hollow tubes, with the lower component arranged concentric with and outside of the uppermost component. The jamplate is arranged to jam against an inner surface of the lower elongated component and against the uppermost elongated component. More specifically, the jam-plate is arranged to apply a force that has a radially outward component against each of an inner surface of the uppermost leg component and an inner surface of the lower leg component. The jam-plate can press directly against an inner surface of the uppermost elongated component, typically an extended portion thereof. Alternatively, the stand can include a bushing fixed to the ground end of the uppermost leg component. The jam-plate is arranged to jam against the uppermost elongated component by jamming against the bushing.

In an advantageous embodiment, the uppermost and lower elongated leg components comprise hollow tubes, with the lower component arranged concentric with and outside of the uppermost component, the control rod comprising a rod that passes along the inside of both the uppermost and lower hollow tube components.

Of the control motions, in one embodiment, the user interface collar comprising a collar, the unified control motion comprising rotation around a unified control axis, the first single control motion comprising tilt around a first, single control axis and the second single control motion comprising tilt around a second, single control axis. The single control axes may lie in a plane that is perpendicular to the unified control axis.

There are various forms that the collar can assume. The collar can have, for each control rod, a cam recess surface shaped to simultaneously force each of the control rods away from the collar if the collar is rotated around the unified control axis, and, individually, force a single control rod away from the collar if the collar is tilted around a single control axis associated with the respective single control rod. In one embodiment, the cam recess surfaces comprise a two level well, with a sloped region joining the two levels. Or the cam profile can be a continuous 360° wave profile having at least two levels, as described above, in a repeating pattern around the circumference of the user control element.

The leg components can have various shapes, including circular cylindrical, square tubes, triangular tubes, etc. If the legs components are circular cylinders, then an advantageous shape for the jamplate is one having at least one arcuate curved edge, for instance, a portion of an oval, or ellipse, or other curved shape. If a busing is used, then the jam-plate may have an arcuate edge, opposite a straight edge.

An exemplary user interface for a tripod is a three-lobed unitary collar, which controls both unified motion of the control rods, and individual motion of the control rods. The unified control motion may substantially simultaneously force the control rods toward the ground ends of the legs, or, alternatively, their shoulder ends. Similarly, the single control motion may force the respective control rod toward the ground end of the legs, or the shoulder end.

Another invention disclosed herein is similar to that described above, but, rather than a control rod, other control linkages can be used, such as a tension bearing cable, or a network of links. In such a case, the control member extends from the lock mechanism to the user interface collar, and terminates in a control component. Adjacent the control components of the plurality of control members, the collar has, for each of the control components, a control activation element. The control member is coupled to the lock mechanism to selectively lock or unlock the lock mechanism if the control mechanism is moved. The collar is coupled to the support, similar to that as described above, so that a unified control motion of the collar simultaneously moves all of the control members so that all of the lower components are free to translate relative to the respective uppermost components, and different single control motions of the collar move only an individual one of the control members so that a corresponding one of the lower components is free to translate relative to its respective uppermost component, while simultaneously, all others of the lower components are unaffected with respect to translating relative to their respective uppermost components.

There is also disclosed an equipment stand comprising at least three telescoping legs. Each leg has at least two telescoping components. A single, unitary control user contact member is operative to selectively perform one of the following release functions: release all of the legs for telescoping adjustment between the at least two telescoping components; and release only a selected one of the legs for telescoping adjustment between the at least two telescoping components of the one leg, while, simultaneously maintaining all others of the legs locked against adjustment between the at least two telescoping components of the other legs.

A typical version of such a stand is a tripod. The stand my have telescoping, cylindrical leg tubes. The tubes may be circular cylinders.

This variation may have, for each leg, a lock mechanism and a control linkage. The lock mechanism is operative to selectively lock the two telescoping components against relative motion, and to free them for relative motion. The control linkage is arranged to couple the lock mechanism to the user contact member.

The unitary control user contact member may comprise a collar, that is rotatable around a unified motion axis to release all of the legs for telescoping adjustment.

The collar may be further tiltable around: a first single motion axis to release a first of the legs for telescoping adjustment; a second single motion axis to release a second of the legs for telescoping adjustment; and; a third single motion axis to release a third of the legs for telescoping adjustment.

The first, second and third single motion axes may all intersect at a single point. Alternatively, the first and second single motion axes may intersecting at a first intersection point, the second and third single motion axes may intersect at a second intersection point, and the third and first single motion axes intersecting at a third intersection point, the first, second and third intersection points forming vertices of a triangle having a centroid through which the unified motion axis runs.

Still another invention is a locking telescoping leg mechanism. It comprises an uppermost elongated hollow tubular leg component, having an inside surface and an outside surface; and a lower elongated leg component, having an inside surface and an outside surface. The uppermost and lower components are elongated. The uppermost and lower elongated leg components are translatable relative to each other, along the axis of elongation. The uppermost component has a shoulder end, and a ground end. The lower component has a shoulder end and a ground end, with the shoulder end of the lower component being located nearer to the shoulder end of the uppermost component than is the ground end of the lower component. A releasable lock plate engages both the uppermost and lower components. The jamplate is movable between: a locking configuration and an unlocking configuration. In the locking configuration, it applies a radially outward force to the inside surface of the uppermost component and the inside surface of the lower component. In the unlocking configuration, at least one of the radial outward forces is small enough so that the components are movable relative to each other under the influence of a force less than the force of gravity applied to the lower component. Coupled to the jam-plate is a control member, which extends from the jamplate, inside the uppermost elongated component through substantially its entire length, to adjacent the shoulder end, terminating in a shoulder end. The control member is coupled to the lock plate such that motion of the control member moves the lock plate from the locking configuration to the nonlocking configuration.

There may be a spring that forces the control member toward a rest position, which corresponds to the locking configuration of the lock plate. The lock plate may be arranged to provide a force directly to the upper leg component, or, indirectly, for instance, through a bushing. There may be a jam-plate support that has a surface with a slot, and the jam-plate then is a plate having an edge that is sized and shaped to fit into the slot.

The jam-plate is arranged such that in the locking configuration, it constitutes a portion of a continuous force path from the lower elongated leg component to the upper elongated leg component, and in the non-locking configuration, the jam-plate is moved such that the force path from the lower elongated leg component to the upper elongated leg component is discontinuous at the jam-plate.

The inventions disclosed herein will be understood with regard to the following description, appended claims and accompanying drawings, where:

BRIEF DESCRIPTION OF THE DRAWINGS

FIG. 5 shows schematically the user interface control collar shown in FIG. 4A, from above, in a slightly inclined orientation;

FIG. 5A shows schematically the user interface control collar shown in FIG. 5, from direction A, in a side view;

FIG. 5B shows schematically the user interface control collar shown in FIG. 5, from directly above, in a plan view;

FIG. 5C shows schematically the user interface control collar shown in FIG. 5, from direction C, in a side view;

DETAILED DESCRIPTION

Figure 1A:
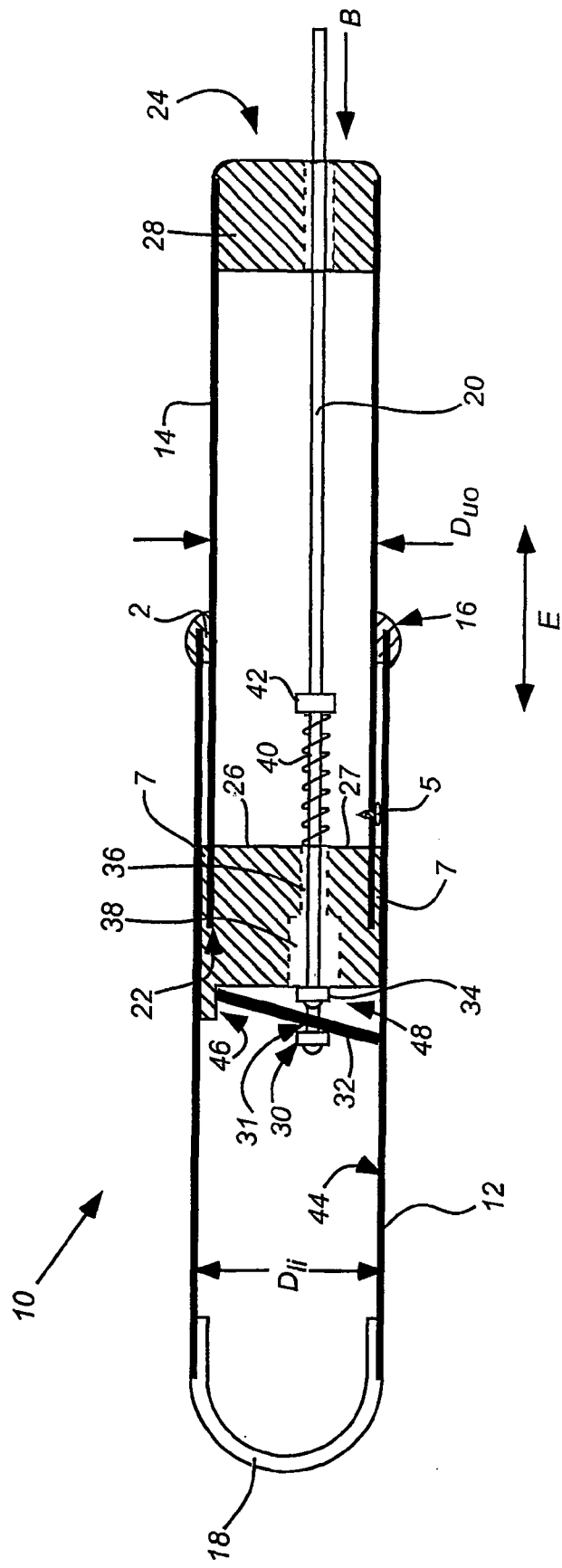
FIG. 1A is a schematic cross sectional view of a single telescoping leg, with internal jam-plate and control rod, with adjacent components shown in a relatively collapsed relation.

The inventions disclosed herein relate to portable stabilization devices, such as monopods and tripods, typically used for spotting scopes, cameras, video cameras, telescopes, etc. There are at least two major aspects to these inventions, and several other ones. A first major aspect relates to mechanism within a single leg that permits it to be locked. The second major aspect relates to a user interface to control a leg locking mechanism in general, and, in particular, the mechanism disclosed. The first aspect (described below as "jam-plates") may be used in connection with a single leg device, such as a monopod, as well as multiple leg devices, such as tripods, or, if practical, two or four leg devices. The second aspect, described below as a "user interface," is only applicable to devices with two or more legs.

Portable tripods can be collapsed into a small volume for easy transportation, and then deployed to full size (approximately human height) when required. The practical method for accomplishing such collapsibility is to construct each leg in multiple, nested, telescoping segments.

Many uses of monopod and tripod supported devices require rapid setup and stabilization (deployment) as well as rapid return to the collapsed state (packing). Using bird watching as an illustrative, non-limiting example, the user needs to quickly focus and stabilize a spotting telescope onto a bird before the bird escapes from view. In addition, the user needs to be able to collapse the tripod quickly to enable rapid relocation to the next spotting site. In addition, users need to be able to quickly adjust the length of individual monopod and tripod legs to accommodate uneven terrain, thereby allowing a tripod to stand erect and stable.

The majority of known monopods and tripods have segmented, nested telescoping legs with an external clamping mechanisms to fix each pair of adjacent segments to one another, creating a leg of adjustable length. For a three-segment leg, the user must generally perform two extension operations for each of the three legs, for a total of six operations. The user must then use both hands to manually adjust the lengths of individual legs to accommodate uneven terrain. For instance, a knurled ring around the outside of the leg must be tightened. Sometimes, such a ring is hard to release and rotate. These operations take an excessive amount of time, and therefore reduce the success and enjoyment of a bird-watching session.

Thus, such a conventional tripod has numerous problems including, at least, the following. Multiple manual operations are required to extend or collapse a single leg. Two hands are required when making adjustments in the length of an individual leg. An excessive amount of time is required to perform the aforementioned operations. Individual legs must be extended, or collapsed, individually. Also, sometimes excessive force and/or torque is necessary to ensure that the knobs/levers are tight enough to restrict movement on conventional tripods.

Basic Jam-plate and Control Rod Configuration. FIG. 1A shows, schematically, a portion of a leg with an internal jam-plate, in cross-section. (As used herein and in the claims, jam-plate and lock-plate are synonymous.) The leg 10 is generally elongated along the dimension indicated by the arrow E. It has a lower leg component 12 and an upper leg component 14. The lower component 12 typically has a circular cylinder as a crosssection along a plane that is perpendicular to the dimension E of elongation. (The cross-section can also be other regular shapes, such as a square, rectangle, or other shapes in which a jamplate, described below, can work as a lock.) In the embodiment shown, the lower component 12 has an inner diameter $D_{li}$ that is larger than the outer diameter $D_{uo}$ of the upper component (although this relation may be reversed). This is useful for applications where the equipment support is used in wet or watery conditions. If so used, the lower leg can be placed in water that is almost as deep as its upper support end 16, without risk of dragging water and debris from the wet environment into the space between the lower component 12 and adjacent component 14, when the two legs are collapsed together. (This feature alone is not new, nor is it claimed alone. It is mentioned merely to ensure clarity.) An end cap 18 completes the protection from a wet support environment, and also provides favorable friction conditions.

To aid in description, the designations "upper" and "lower" have been assigned to the portions of the legs that would typically be so oriented if the leg is used with its "lower" end resting on the ground, or some other grounded support, and the leg supports the weight of the instrument that it supports, by compression. This is the mode in which the equipment support would most frequently be used. However, the general inventions described herein, can also be used if the leg or legs of the equipment support are anchored to an overhead fixture, for instance by clamps, or other tension bearing couple, and the equipment hangs below. Such an orientation would be extremely rare, but, it is contemplated as a possible use for the inventions disclosed. In such an application, "upper" would actually mean "lower" and vice-versa.

An annular bushing 2 of a low friction material is fixed to the upper end of the lower tube 12 and slides around the outside of the upper tube 14. It provides a favorable sliding pair arrangement that is rather easy to fabricate. In addition, the support bushing 26 has an annular portion 7 that also provides a sliding bearing, against which lower component 12 slides. Further, the lower 12 and upper 14 components have relative inner diameter $D_{li}$ and outer diameter $D_{uo}$ that are sized, with enough clearance therebetween, such that any friction that arises therebetween is so small that when the two nested components are held with their dimension of elongation E aligned with the action of the force of gravity, and the upper component is retained against translation, the force of gravity is sufficient to cause the lower component to move at a speed that is great enough to be convenient for unassisted extension of the tubes. Typically, this would result in full deployment of a pair of adjacent tubes in less than one second. There may also be damping provided, as described below.

Figure 6:
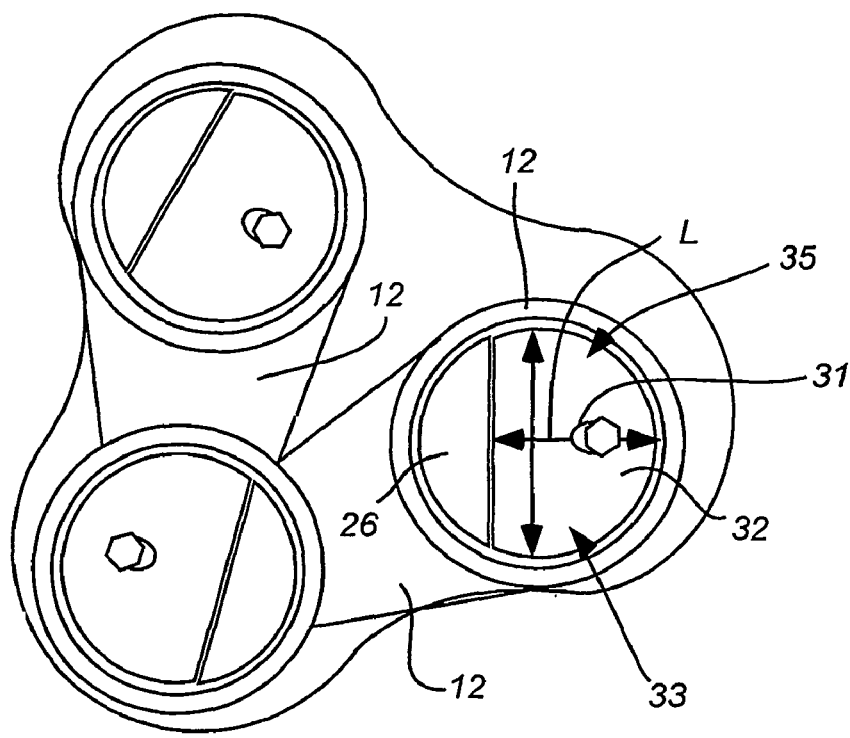
FIG. 6 shows, schematically, an end view of three leg tubes and their respective jam-plates.

A control rod 20 extends the full length of the upper component 14, and, slightly beyond at both the lower end 22 and the upper end 24. The control rod 20 is located within the interior of the upper component 14 by means of a lower 26 and upper 28 bushing, each of which have holes through which the control rod passes. Note that the control rod 20 need not be concentric with the upper component 14 (or the lower component 12). In fact, it is preferable that the location be eccentric, not concentric, because eccentricity facilitates tipping the jam-plate as described below. (For embodiments with more than two adjacent components, this lack of concentricity is exploited further, as explained below.) Further, to facilitate tipping of the jam-plate, a hole 31 is a slightly elongated slot, elongated in the direction across the diameter of the tube components shown in cross-section, and also as shown in FIG. 6. The length of the hole must be sufficient to allow the plate to tilt, but not so long that the plate is too loose in the unlocked position. It has been found that, in general, a length equal to about 2–3 diameters of the control rod 20 is appropriate.

The control rod 20 terminates in a stop 30, such as a nut or stamped end, or other equivalent stopper. The stopper retains a jam-plate 32 from slipping off from the end of the control rod. The stop 30 also pushes the jam-plate 32 into the locking configuration, as the spring 40 pushes the control rod 20 and the jam-plate toward the upper component 12, as explained below. An actuation nut 34 (or equivalent stopper) actuates the jam-plate in the downward direction, as discussed below, to release the lock. The lower support bushing 26 has a channel 36 therethrough with an enlarged diameter relief 38 at the lower end to allow the actuation nut 34 to fit within it. A return spring 40, for example, a coil spring, is trapped between the support bushing 26 and a spring stop 42. The return spring returns the control rod to a rest position, which, in the embodiment shown, corresponds to a locking configuration. A travel stop 5, such as a screw or pin aids in preventing the upper and lower components from being pulled totally apart from each other.

Figure 6A:
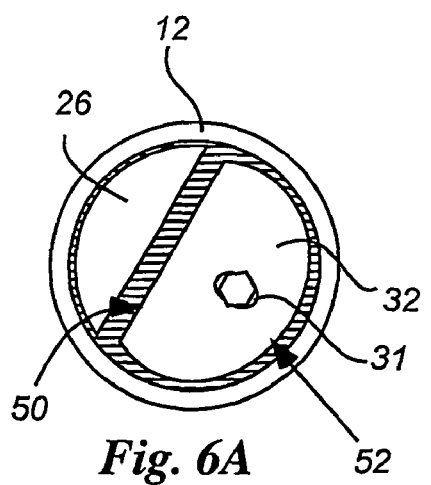
FIG. 6A shows, schematically, an end view of a single leg tube with its jam-plate in an unlocked orientation.

FIG. 6 shows, schematically, the geometry of the jam-plate and the bushing and the lower component, in a locked configuration. FIG. 6A shows the corresponding geometry for an unlocked configuration. The jam-plate 32 is sized to fit roughly between an inside surface of the lower component 12 and an inner surface 46 of a cut away end portion 48 of the lower support bushing 26. The size is such that the extent of the portion of the jam-plate 32 aligned roughly along the dimension from the surface 46 of the bushing, toward the inner surface 44 of the lower component 12, indicated by the arrow L in FIG. 6, is longer than the distance between the surface 46 and the inner surface 44 along that dimension. In the embodiment shown, the shape of the space is straight at one end, and curved at the other, roughly a portion 52 of a circle, or an oval, or an ellipse, with one end 50 cut off, at a chord. The shape of the jam-plate 32 is approximately congruent, but the distance from the chord 50 to the apex of the curve of the arc 52 is longer than the corresponding distance of the open space.

Operation of Jam-Plate. The operation of the jam lock is as follows.FIG. 1A and FIG. 6 show the lock in a locking configuration. It is locked, because the jam-plate presses against both the support bushing 26, and against the inner surface 44 of the lower leg component 12. The support bushing 26 is fixed to the lower end 22 of the upper leg component 14. Any force that would act to collapse the upper and lower components toward each other also tends to force the jam-plate into a position that is more closely perpendicular to the axis E. This also tends to increase the jamming force, and to resist collapse of the leg components.

Figure 1B:
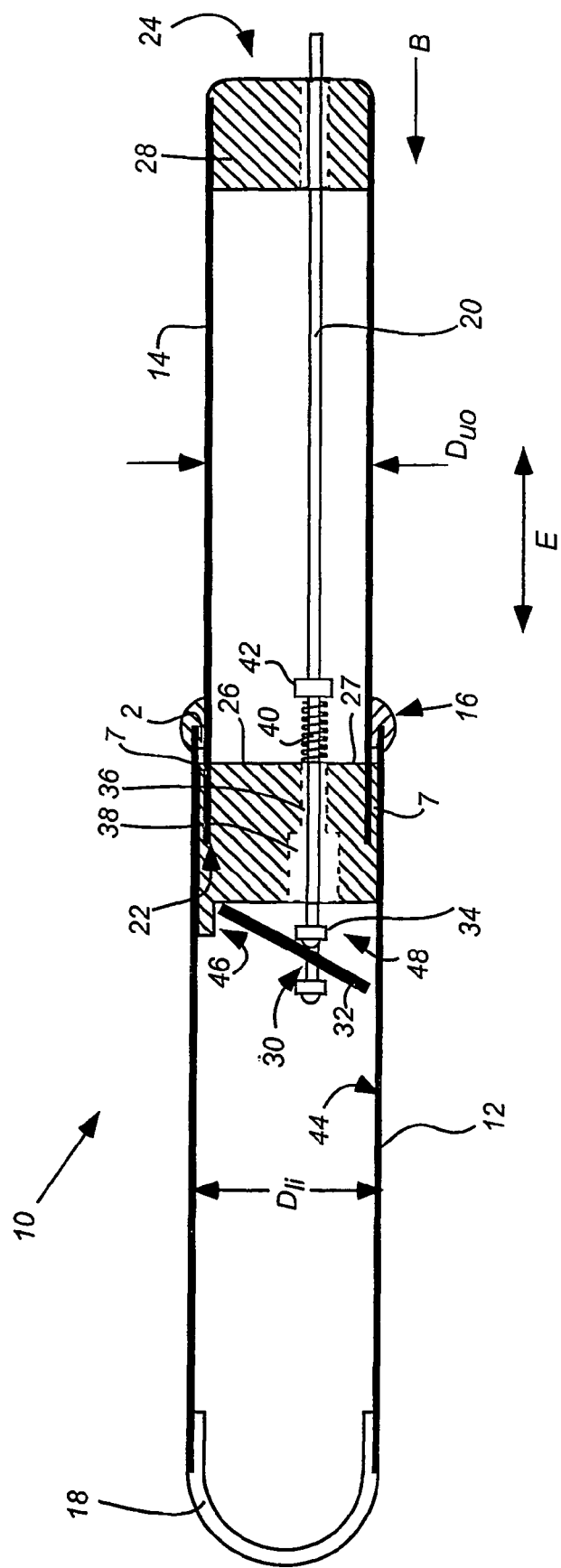
FIG. 1B is a schematic cross sectional view of a single telescoping leg shown in FIG. 1A, with adjacent components, shown in a relatively extended relation as compared to that shown in FIG. 1A.

If the user desires to unlock and re-configure the components, the user pushes the control rod 20 (by means described below) toward the ground end of the legs along the direction of the arrow B. (The various means by which the rod may be pushed is discussed below.) The configuration of the jam-plate and rod in an unlocked configuration is shown in part in FIG. 1B. The stop 34 causes the jam-plate 32 to change its orientation relative to the axis E of elongation, and thus, to the opening inside the space between the inside corner 46 of the lower bushing 26 and the inside wall 44 of the lower component 12. This unlocked configuration is also shown in FIG. 6A. Basically, the plane of the jam-plate becomes more parallel to the axis of elongation E, and thus, the projection of its length along the dimension L, onto a plane that is perpendicular to the dimension of elongation E of the legs, becomes smaller. In other words, the jam-plate tilts and no longer jams against the support bushing 26 and the interior 44 of the lower component 12 at both its ends 50, 52.

With the jam-plate no longer jamming against these components, there is no longer enough force between them to resist relative motion therebetween, in either the collapsing or extending directions. Typically, as mentioned above, they will move relative to each other simply under the force of gravity applied to either the upper or lower leg component 14 or 12, while the other component is held stationary.

In general, the jam-plate operates by providing a force path between the upper component 14 and the lower component 12, which results in a force being applied to both. The force that is applied to each, has a component that is radially outward with respect to the respective leg components. This radially outward force applied to each component also gives rise to a frictional component that is normal to the radially outward force. The frictional force opposes collapse of the leg components together. Further, as the leg components are pushed toward each other, that tends to tilt the jam-plate more toward the locking configuration, thereby increasing the radial, and the normal forces, and thus, further resisting collapse of the components together. (By "radially outward," it is meant generally from an inner region, such as a central axis outward toward the perimeter wall of the leg component. In this discussion, "radially" is being used loosely, and is not meant to be limited to precisely along a radius, from a center.)

There are known devices where a jamming force operates radially inward upon a wall of an inner tube, and radially outward on a wall of an outer tube. For instance, there are mechanisms where a wedge is forced between facing faces of nesting tubes: i.e., between the outer face of an inner tube and the inner face of an outer tube. There are also devices where a jamming force is applied between an outer surface of a tube, and a collar that surrounds the tube.

Thus, by pushing the control rod 20, the locking mechanism is disengaged, to allow either extension of the leg components away from each other, or compression of the leg components toward each other, to a compressed configuration. By releasing the control rod to return to its rest position relative to the upper component 14, under influence of the spring 40, the jam-plate 32 again returns to its orientation shown in FIG. 1A and FIG. 6, that is closer to perpendicular to the axis of elongation E, and thus jams between the corner 46 of the lower bushing 26 and the inner wall 44 of the lower component 12. Thus, the lower 12 and upper 14 leg components are again locked against relative translation.

An advantageous feature of the jam-plate 32 is that an increase in the load (more pressure applied to the legs, such as by the operator leaning on the upper portion of a leg) causes the jamming force to increase. Thus, the leg support function is not prone to failure under an increasing load.

Figure 6B:
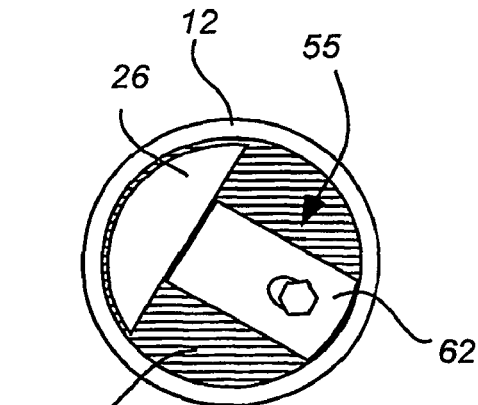
FIG. 6B shows, schematically, an end view of a variation of a reduced size jam-plate, with lateral edges removed.

Other Shapes for Jam-plate. As shown in FIG. 6, each individual jam-plate 32 may be substantially congruent with the space in which it resides, but is a little bit larger than the space, at least along the dimension L. However, this need not be the case. For instance, as shown in FIG. 6B, the lateral edges 33 and 35 of the jam-plate can be eliminated, such that the modified jam-plate 62 has only a central portion, bounded by spaces 53 and 55 between the inner walls 44 of the tube. This variation may be useful for very lightweight models, or to simplify some aspects of manufacture. On the other hand, it might be more prone to undesired jamming, or failure to jam when desired, as the jam-plate may be more prone to twist around the long axis of the control rod, due to the abundant clearance.

Figure 9A:
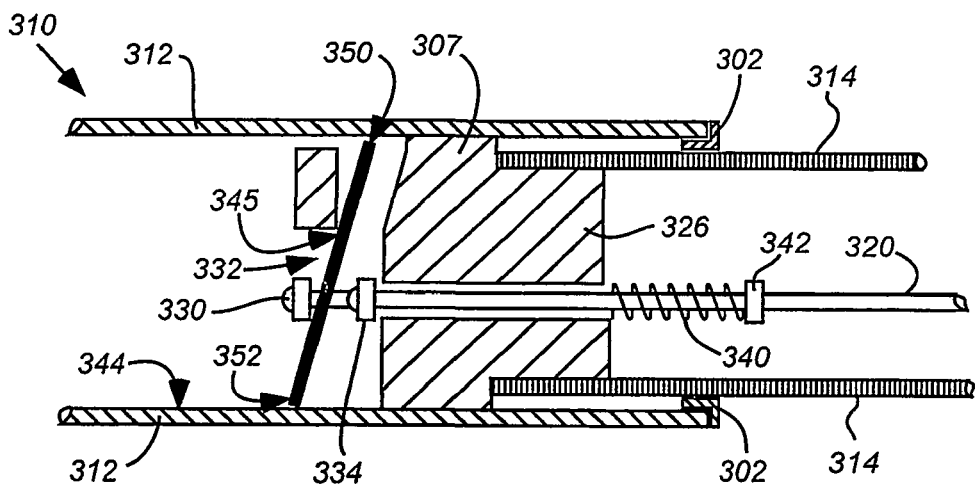
FIG. 9A shows, schematically, in a cross-sectional view, a jam-plate and support as shown in FIG. 8, along lines 9—9, in use to lock two adjacent tube components of a leg, in a locking configuration.

In general, the jam-plate and its support must provide a force path from one leg component to an adjacent leg component. For the inventions described herein, the force is ultimately applied to each leg component in a generally radially outward direction, thereby giving rise to a normal friction force that opposes translation of the leg components. The force may be applied from the jam-plate to each component by direct contact with each, (FIG. 1C), by contact with a support bushing that is fixed to the component (FIG. 1A, FIG. 9A (tabbed jam-plate), FIG. 11A (hinged jam-plate)), or, through a pivot that is fixed to the other component, either directly, or, through a bushing or other support (FIG. 7 (three component leg)). Each of these variations is discussed below. It will be noted that in most cases, it is helpful that the jam-plate pivot around a fixed point, such as in internal corner of a support bushing. However, this is not absolutely required. The pivot point may be at an edge of a jam-plate, as shown in FIG. 1A, or, along its length, as shown in FIG. 9A.

Figure 8:
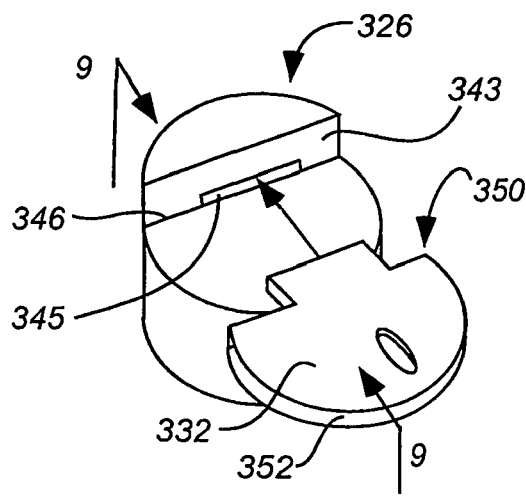
FIG. 8 shows, schematically, in perspective view, a jam-plate that has a tab, and a bushing support for use therewith.

FIG. 8 shows a part of a useful embodiment. In this embodiment, the jam-plate 332 has an arcuate edge 352 and a tabbed edge 350. The tab of the edge 350 fits into a slot 345 in a corner 346 of a slotted jam-plate support bushing 326. As shown in FIG. 9A, which is a cross-section of a jam-plate 332 and support bushing 326 as shown in FIG. 8, incorporated into a two component joint in a leg, the support bushing 326 fits into an upper end of a lower leg 314, in the same manner as described above. The jam-plate 332 is carried by and controlled by a control rod 320, similar to that described above. An end nut 330 urges the arcuate edge 352 of the jam-plate 332 to jam against the inner wall 344 of the lower component 312, under action of the return spring 340. The tabbed edge 350 of the jam-plate is urged to press against the face 343 of the support bushing 326 (shown in FIG. 8, but not visible in the section shown in FIG. 9A). This, in turn, forces the support bushing 326 against the inner wall of the upper tube 314, thereby completing the force path and resulting in a jamming force that prevents the components 312 and 314 from collapsing toward each other when the plate 332 is in the jamming orientation. The circumferential portion 307 of the support bushing 326 also serves as a sliding bearing between the busing 326 (and thus, the upper leg component 314, to which it is fixed) and the lower leg component 312.

Figure 9B:
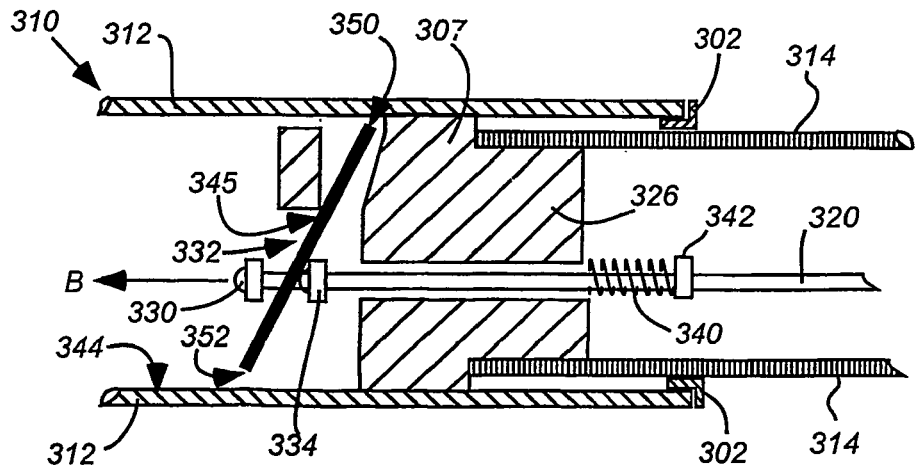
FIG. 9B shows, schematically, in a cross-sectional view, the jam-plate and support as shown in FIG. 9A, in a non-locking configuration.

FIG. 9B shows the same elements as the control rod 320 is pushed downward, in the direction of the arrow B. The jam-plate edge 352 is lifted away from the inside wall of the lower component 312, and the jamming force ceases, permitting relative translation of the two leg components. It can be observed that the jam-plate 332 pivots around the corner of the face 343, that borders the slot 345. It will also be understood that the tabbed edge 350 and the slot 345 cooperate to ensure that the jam-plate stays in the proper location, as it is pushed downward (in the direction of the arrow B) by the control rod. This may add some stability to the system, which is not present in the embodiment shown in FIG. 1A where the jam-plate is simply forced into the corner 46 of the support bushing 26. It may be that the tolerances required for the tabbed and slotted embodiment shown in FIG. 9A are not as stringent as those required for the un-tabbed embodiment shown in FIG. 1A.

As shown in FIG. 8, the slot 345 does not extend the entire width of the support bushing 326. However, a similar embodiment is for the slot to extend the entire width, leaving an overhanging portion of the face 343, above a wide opening. In that case, the edge 350 of the jam-plate 352 need not be tabbed, and, rather, can be straight across. The function is somewhat similar, with slightly less security along the dimension from side to side of the jam-plate (into and out of the page, as shown with reference to FIG. 9A).

Figure 11:
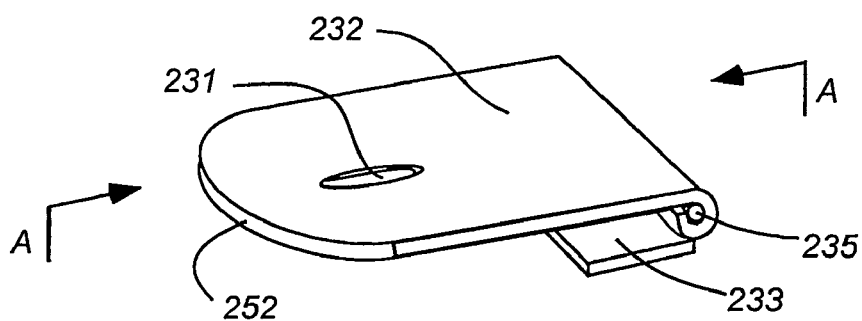
FIG. 11 shows, schematically in a perspective view, a jam-plate that can be hinged to a support bushing.
Figure 11A:
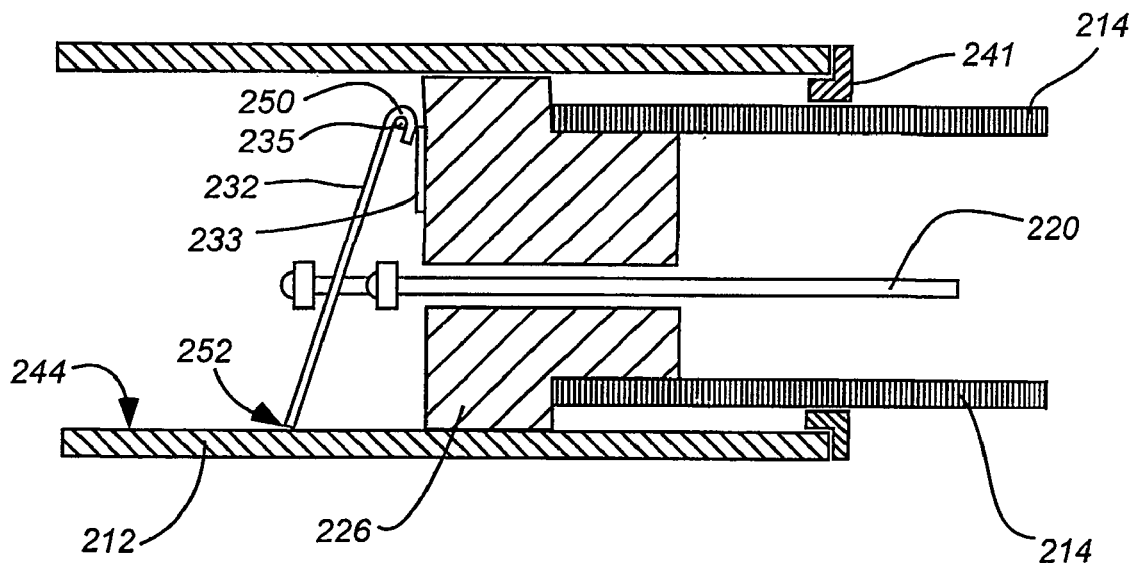
FIG. 11A shows, schematically, in a cross-sectional view, a hinged jam-plate as shown in FIG. 11, as cut along lines A—A, fixed to a support bushing, also in cross-section.
Figure 11B:
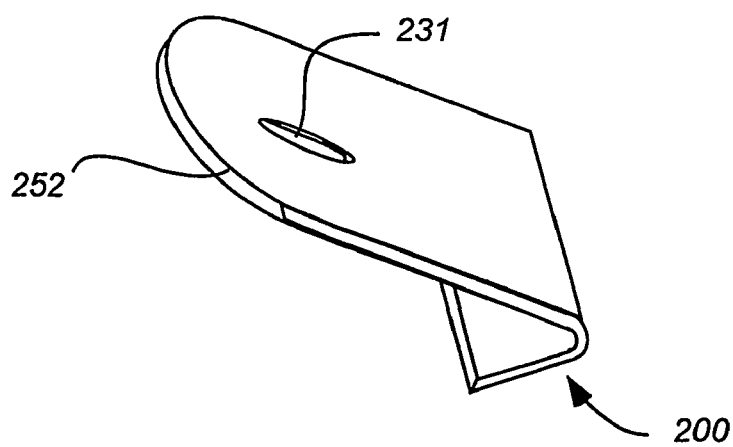
FIG. 11B shows, schematically, in a perspective view, a jam-plate that includes a living hinge.

Another alternative, as shown in FIG. 11A, is to have a jam plate 232 be one segment of a hinge, and the hinge be attached through a hinge base 233 to a support bushing 226. The free, or unhinged edge 252 of the jam-plate 232 jams into the wall 244 of the lower tube 212, and the hinged end "jams" against the upper tube component 214, by jamming into the hinge pin 235, which is fixed to the upper component through the hinge base 233 and the bushing 226. As shown in FIGS. 11 and 11A, the hinge can be a simple pinned hinge. Or, as shown in FIG. 11B, it can be a one piece, living hinge 200 fabricated from plastic, metal, or a composite or other synthetic material. It is even possible to fashion such a hinged jam-plate unitarily with an adjacent support bushing, which could further be unitary with a sliding bushing component. The living hinge can have virtually no spring constant, or, the hinge motion can be resisted by a small springiness in the flexible portion of the living hinge, thereby helping to maintain regularity in the rest position of the jam-plate portion of the hinge.

Figure 1C:
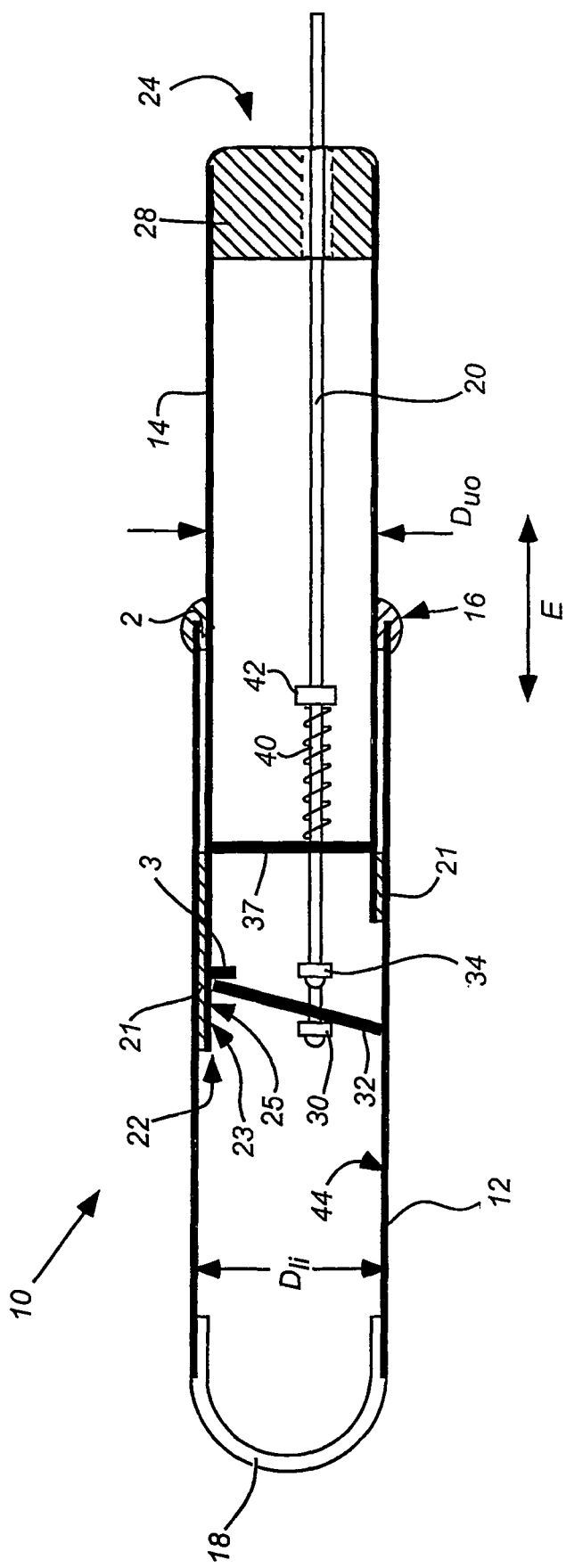
FIG. 1C is a schematic cross sectional view of a single telescoping leg similar to that shown in FIG. 1A, but without a jam-plate support bushing.
Figure 6C:
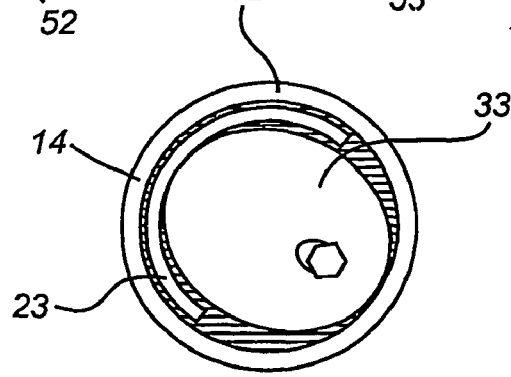
FIG. 6C shows, schematically, an end view of a single leg tube without a jam-plate support bushing.

According to another variation, (as shown in FIGS. 1C and 6C) the support bushing 26 can be eliminated. The bushing 26 serves two general purposes. One general purpose is to provide a sliding bearing 7, upon which the lower component 12 slides with little friction, relative to the upper component 14. So, regarding this general purpose, the bushing may be referred to herein as a bearing bushing, or a slide bushing. The second general purpose is to provide support for other elements, such as the jam-plate and the spring 40. Regarding this general purpose, the bushing may be referred to herein as a support bushing or a jam-plate support. In some of the embodiments described herein, these general purposes are served by multiple individual elements, rather than by a bushing.

A support purpose of the bushing is to provide a support, or brace, against which the jam-plate is forced, that is rigidly coupled to the upper leg component 14. This provides a pathway for the jamming force to be applied to the upper component 14. This function is served by the corner 46 of the bushing, principally, its circumferential wall.

Thus, in an embodiment without a bushing, the jam-plate must still jam against some brace portion of the upper component 14, or an extension thereof or an element that is rigidly coupled thereto to transmit force to the upper component 14. (It should be understood that the bushing 26 acts essentially as an extension of the upper component 14. Thus, when, in this disclosure, it is stated that the jam-plate jams against the upper leg component 14, it also contemplates that it jams against something rigidly coupled thereto, such as the bushing 26, or another element that is fixed to the upper leg component.) Thus, the upper component 14 can be asymmetrical around its axis of elongation, with an extension 23 around approximately one-half of its arc, extending roughly to where the end of the bushing 26 would extend, were it present. A small ledge 3 can aid in providing a seat into which the edge of the jam-plate can pivot, although, this ledge is not absolutely necessary.

Another support purpose of a support bushing is to keep the jam-plate spaced within a certain minimum distance away from the upper component, i.e., to keep the jam-plate from being pushed away from the upper component when the control rod is pushed. This function is served by the upward facing wall 27 of the bushing 26, which prevents the spring 40 and the rod 20 from traveling too far downward.

A rib 37, or other brace serves the same support purpose as the back 27 of the bushing 26, to engage the spring 40. Even without the support bushing, it is helpful if a slide bearing 21 is provided, as shown, which, in this case, is in the form of an annular cylinder, having a wall length that is longer on one end of a diameter than it is on the other end of the diameter.

Alternatively (not shown), rather than an extension of the upper tube component 14 at the side where the jam-plate contacts it, there can be a cut-out of the upper tube component at the side where the jam-plate contacts the lower tube component, with an ear or tab of the jam-plate extending therethrough, to jam against the lower tube wall.

Any of these variations can be achieved, and their usefulness will depend on the cost and usability considerations. Typically, those variations that require fewer components may be less expensive to make, but require more manufacturing precision to ensure ease of use.

Damping of Leg Extension/Collapse. When the jam-plate 32 is in the unlocked position, the upper and lower components 14 and 12 are relatively free to translate relative to each other. The degree of resistance to such motion depends on the clearance between the jam-plate and the upper and lower components, as well as any friction, or damping between the upper and lower components themselves, in their region of overlap or, more typically, between the components 12 and 14 and the adjacent annular bushings 16 and 26. The designer can provide as much or as little damping as required. The designer can strive for complete clearance at all locations, thus, providing essentially resistance free motion when the lock is disengaged. Or, the designer can intentionally provide for some frictional dragging between either the upper and lower components, or the jam-plate and either or both of the leg components. The designer can intentionally provide explicit damping elements in these positions, such as the low friction bushings 16, or even pneumatic dampers, such as semi-sealed spaces. For instance, vent holes can be provided in the upper bushing 28 and the jam seat bushing 26. At least one of the bushings must block off the air in the leg sufficiently to have a pumping (displacing) effect on the air when the leg is extended.

It is possible to also provide foam plastic rubber dampers. Also, a combination of springing (at the end of the stroke by a foam rubber spring) and a pneumatic damping, is elegant and robust.

Rather than using a coil spring such as shown at 40, any suitable spring can be used, such as a leaf spring, Belleville washer, or an elastomeric block. The spring can also be positioned in other places. A compression spring can act against the upper face of the upper bushing 24, or a tension spring can act against the bottom face of the upper bushing 24, or against a fitting secured to the upper component in some other fashion.

Jam-Plate Located within Tubes, Jam between Inner Surfaces of Both. The jam-plate arrangement discussed above is unusual because it operates between generally facing, inner surfaces of adjacent components, lower leg component 12 and upper leg component 14. For instance, as shown in FIG. 1C, the jam-plate 32 operates between the face 44 of the lower component 12, and the generally opposite face 25 of the upper component 14. To do this, either a portion of one of the components must be removed, such as part of the lower end 22 of the upper component 14, or, an extending component, such as a support bushing 26 (FIG. 1A) must be provided that transfers force from one portion of the component to another. By generally opposite faces, a non-rigorous definition is meant. For instance, a pair of surfaces that lie at opposite ends of a line that passes through the central axis of the leg, with the central axis of the leg being between the faces, are generally opposite faces, as used herein.

Most other instances of jamming type locks operate between an inner surface of a relatively outer component, and an outer surface of a relatively inner component. As such, they operate in a relatively small space. This makes it difficult to achieve robust stopping force. Also, it requires that the control mechanism pass in the same small space. The jam-plate arrangement discussed above can incorporate a relatively large jam-plate 32. Further, the space in which it resides is relatively large, being almost equal to the entire interior of the lower component. It is also very useful that the control rod 20 passes through near to the center of the elongated components, where there is a lot of space laterally, thereby facilitating assembly, and permitting relatively loose tolerances for the control rod support structures. It also facilitates a design that can be relatively easily extended to three telescoping components, as discussed below.

Cross-sectional Shape of Leg Components. The foregoing discussion has illustrated the concept of the jam lock with leg components of cylinders having circular cross-sections. This is most likely the most useful configuration, as it is immune to unwanted jamming if the components rotate relative to each other. However, cylinders of other cross-sections in which a jam-plate can be placed are possible. (As used herein, cylinder is not limited to a circular cylinder and is used in its general sense.) For instance, the cross-section could be rectangular, particularly square. Additionally, any axially symmetric polygon having an even or odd number of sides, can be used, such as a square, a pentagon, a hexagon, an octagon, etc. In such case, jamming action can be at a flat side or two or more adjacent sides spanning an apex.

In fact, symmetry is not required, and quite a few shapes can be used. If the leg tube has a perimeter shape that could be extruded, then the jam-plate can be roughly of a shape that could be cut from a solid extrusion of that shape, at an angle other than perpendicular to the axis of extrusion. The shape must then be refined for purposes of the proper clearance, interfacing with a bushing, or undercut slot, or other feature. But, the general outline of much of the jam-plate can be so established by the obliquely angled cross-section of an extrusion. For instance, as shown in the figures, the extruded shape is a circle, and the jam plate has an outline that is roughly follows a portion of an ellipse, a conic cross section of the circular cylinder.

The leg component tube need not be a continuous cylinder. It may be an open channel, for instance a partial rectangle, with four corners, three complete sides, and an interrupted side. In that case, the jam-plate is also a rectangle, of slightly larger dimensions. Or, it may be an interrupted circular cylinder, made from a rolled sheet of material whose ends do not meet. Such an open channel design leg component facilitates access to the internal mechanisms for fabrication, repair, and adjustment (at the cost of allowing access to same by dirt and other contaminants). There are also other advantages, such as their minimal weight. Basically, any shape that can trap a jam plate will function properly, as determined by the person skilled in the art by routine experimentation.

Legs Can Be Simultaneously Deployed. The discussion so far has centered on a locking mechanism as used in a single leg. The locking mechanism has advantages over known prior art. The lock can be engaged simply by depressing the control rod (as discussed below). Gravity can be used to do the actual extension and collapse. Further, identical jam-plate locks can be used in each leg of a multi-legged instrument support, most typically, a tripod. As is discussed below, it is possible to provide a user interface that activates multiple control members simultaneously, so that all legs (for instance three) of an instrument can be unlocked simultaneously, and, simultaneously extended or collapsed. For instance, if, in a tripod incorporating such a jam-plate lock, all three control members are simultaneously activated, to release all three locks, then the tripod can be un-collapsed by simply activating all of the control members and suspending the tripod with the lower leg components downward. Gravity acts upon the lower leg components, and they extend.

To retract the legs, the control members are simultaneously activated, the legs' lower ends are pushed against the ground or a support simultaneously, and, they collapse upward toward the upper leg components.

If desired, a preloaded spring, or pneumatic source may be added to facilitate extension. The preload would most likely be most beneficial if provided to overcome static friction before any relative motion of the tube components begins. For instance, a small spring may be provided at the end of the bottom tube component, which provides an initial boost to expanding the leg components from a rest position, but that is easily compressed upon complete collapse, particularly given the momentum and low dynamic friction of the moving components. However, then, this must be overcome to collapse the unit.

Various user interfaces are suitable for use with the jam-plate described above. Several are discussed below.

Figure 2:
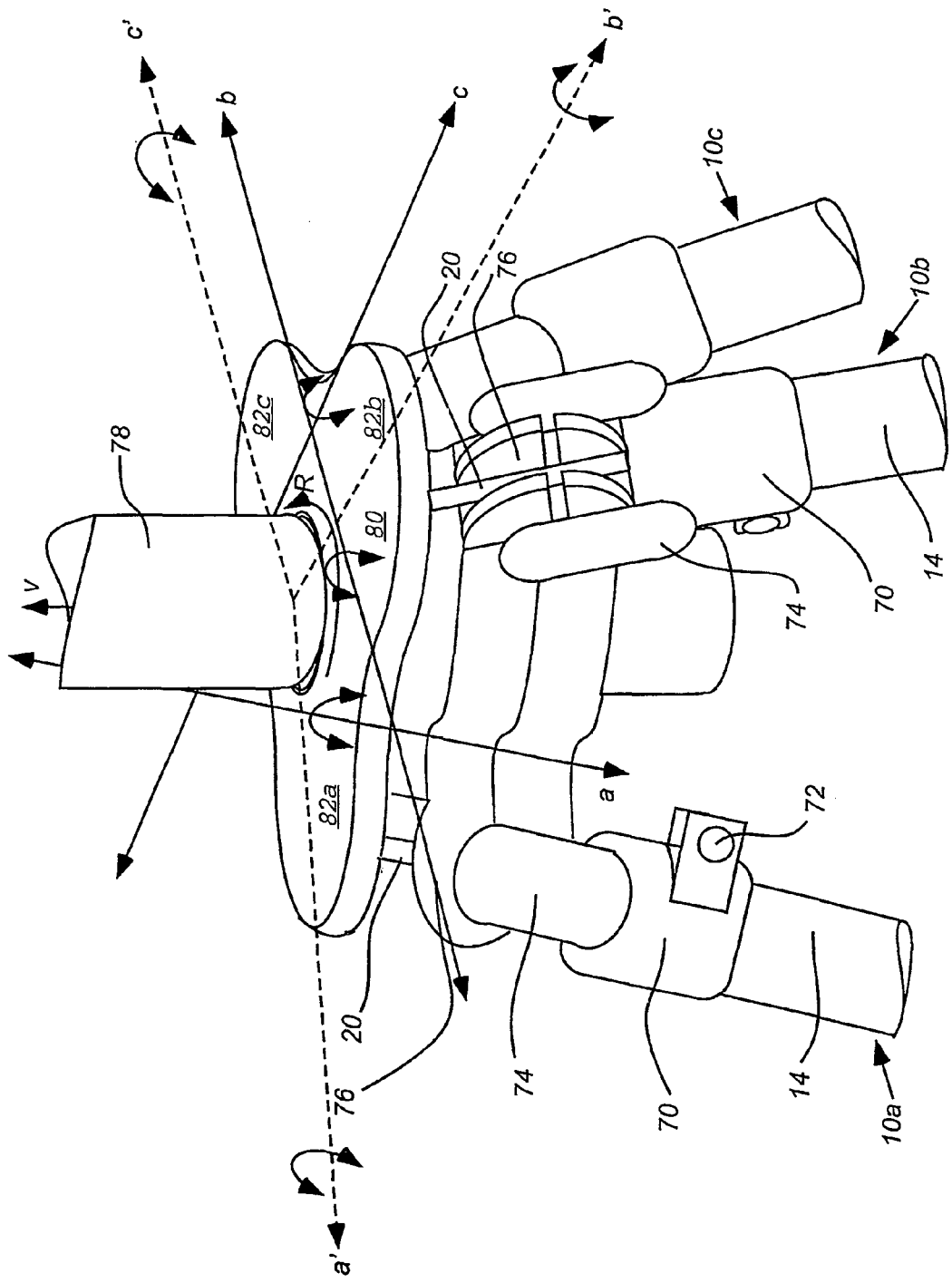
FIG. 2 is a schematic three dimensional rendition of a portion of a tripod incorporating a unitary user interface control collar and a control rod, shown extending from the user interface to within a leg.
Figure 3:
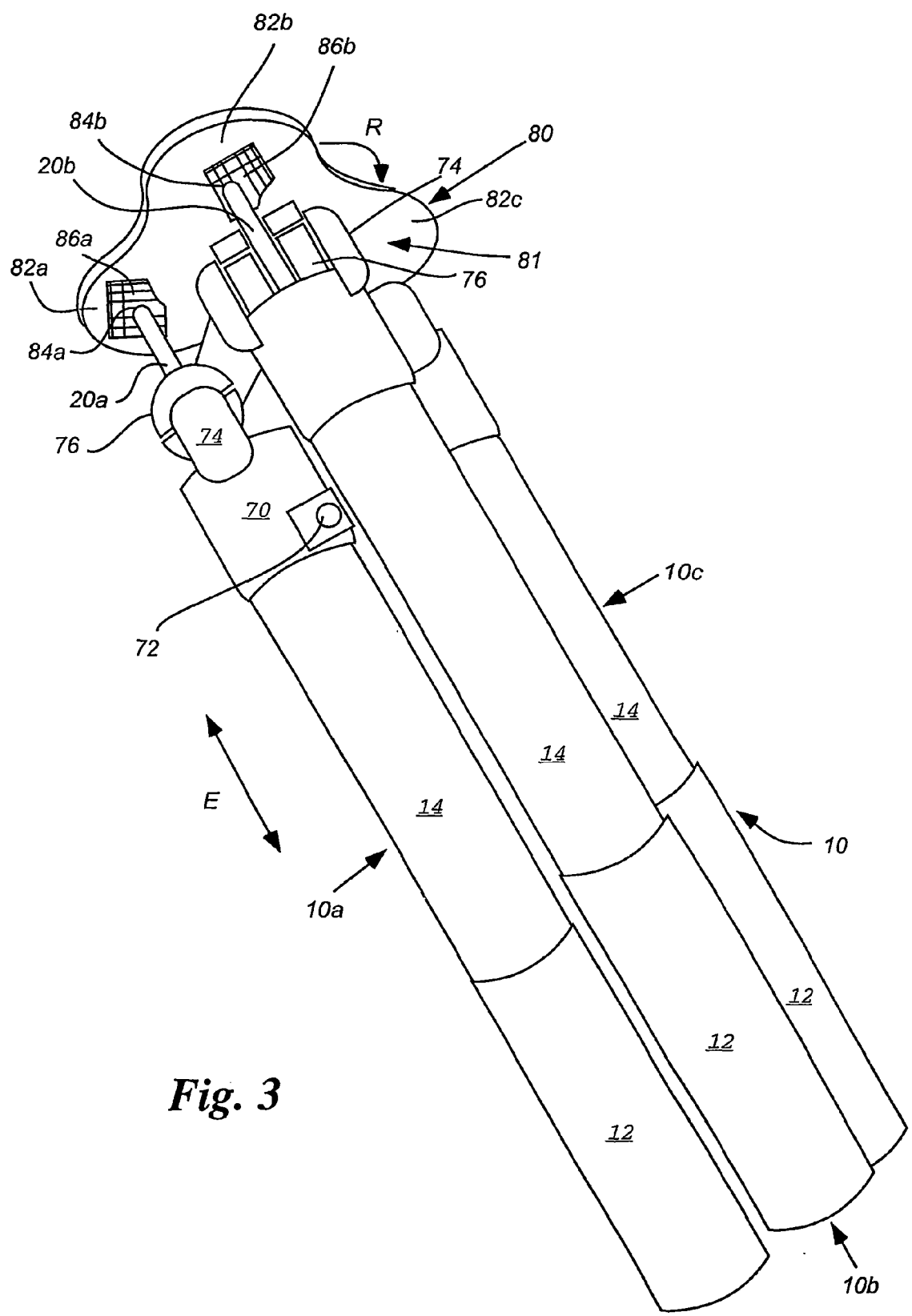
FIG. 3 shows a schematic three dimensional rendition of the tripod shown in FIG. 2, from below the user interface control collar, illustrating a cam follower surface of a control rod engaging a profiled cam recess surface of a control collar.

Unitary Rotary/Tilting User Interface. FIG. 2 shows, schematically, the shoulder portion of a tripod that incorporates a unitary user interface for activating control members that are rods, as discussed above. Three upper leg components 14 are shown. Each has a control rod 20 passing therethrough, as discussed above. Only one such control rod 20 is visible, as shown. Each upper component 14 is secured in a suitable upper socket 70, by a suitable means, such as a clamp fitting 72, or mating threads. Each socket is coupled by a hinge 74 to a shoulder bracket 76. For a conventional tripod, the shoulder bracket supports an equipment support tube 78 by conventional means, not shown, such as a rack and pinion, that enables lifting and lowering the support tube relative to the shoulder bracket by a crank. (Some surveying equipment is mounted directly on a shoulder, without any extended support tube or equipment head. This direct attachment provides enhanced stability.) The hinges 74 enable closing the legs together to form a compact package, as shown in FIG. 3.

A collar 80 is coupled to the shoulder bracket 76 so that it has limited freedom to move. The collar has three lobe extensions 82a, 82b and 82c. The collar is free to rotate (as indicated by an arrow R) around an axis V that is aligned with the equipment support tube 78. In one design, it is not free to rotate fully around this axis, but only through an arc sufficient to activate the control rods 20, as discussed below. A similar design does permit full rotation, as discussed below. In a typical three leg embodiment a rotation through about 5°–40° is sufficient. (A preferable range is 10°–20°.) Rotation could be through as much as 120°, but no more for a three-legged device, as that amounts to ⅓ of the full circumference.

What is required is that the collar be able to rotate enough to actuate the control rod through two positions, as described below. This motion is referred to below as a "unified control motion."

The collar 80 is also free to tilt around three intersecting axes, a, b and c, which each run generally perpendicular to one of three axes a', b', and c' that run from an intersection point at the center of the collar, radially outward through a corresponding lobe 82a, 82b and 82c. Similarly, the collar is not free to tilt unrestrained around these axes but, only through a relatively small angle, which is enough to individually actuate each of the control rods 20. Further, the presence of the equipment support bracket 78 also limits the tilting freedom. Generally, it has been found that the tilt angle can be between 5° and 40°, and preferably between 15° and 30°. These tilt motions around axes a, b or c are referred to below as "single control" motions.

FIG. 3 shows the same elements as are shown in FIG. 2, from below the collar, as seen from the legs 10. The control rod 20a extends from within the upper leg component 14, terminating in a cam follower surface 84a. The cam follower surface presses against the underside 81 of the collar 80, at a relieved cam profile 86a, described more fully below.

Figure 4A:
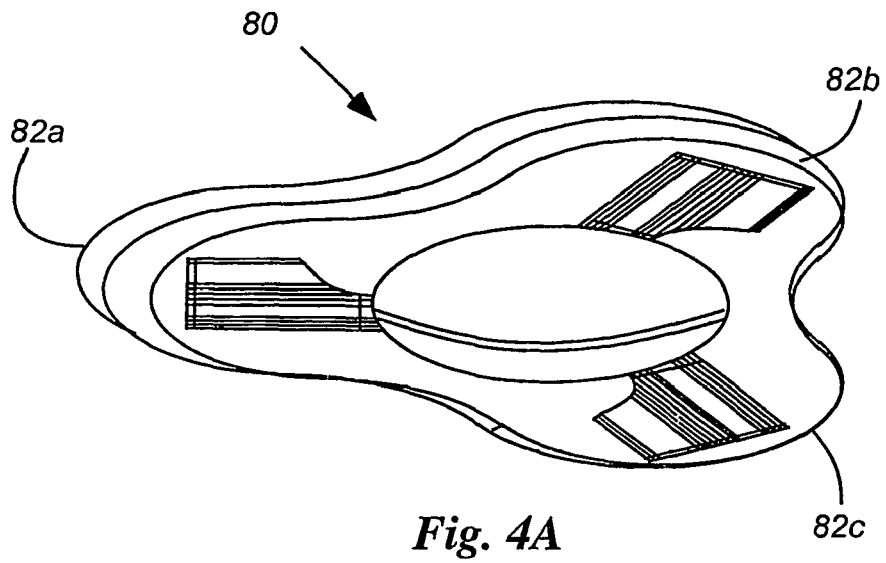
FIG. 4A shows schematically a user interface control collar from below, in a slightly inclined orientation.
Figure 4B:
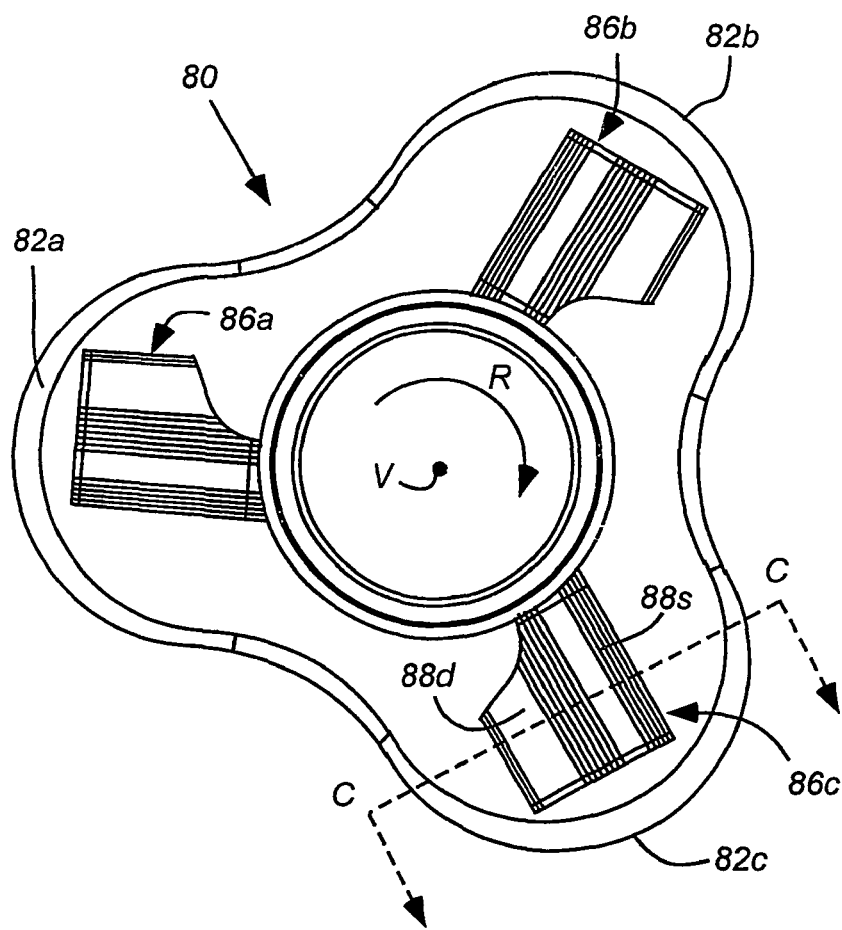
FIG. 4B shows schematically the user interface control collar shown in FIG. 4B, directly from below, in a plan view.
Figure 4C:
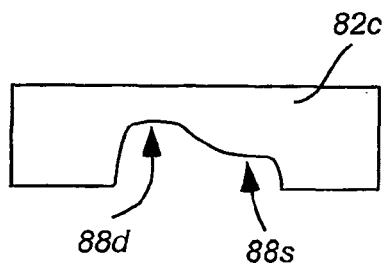
FIG. 4C shows, schematically in partial cross-section, an edge of a lobe, cut along lines CC, shown in FIG. 4A, through a cam recess.
Figure 4D:
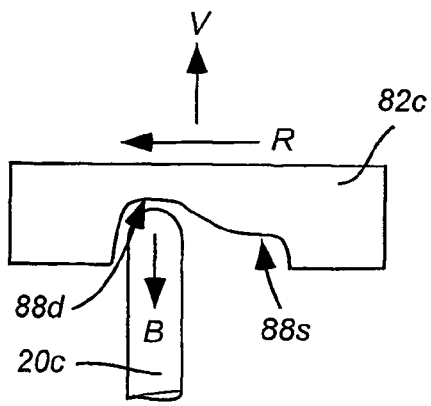
FIG. 4D shows, schematically, a recess in cross-section as shown in FIG. 4C, with a control rod extending into a deep region of a recess.
Figure 4E:
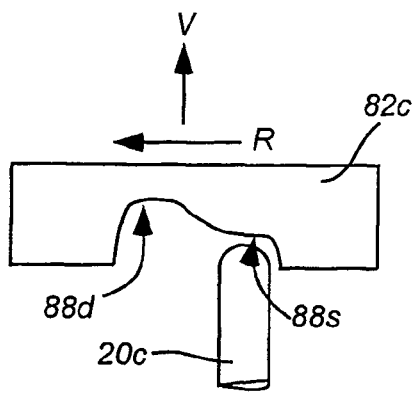
FIG. 4E shows, schematically, a recess in cross-section as shown in FIG. 4C, with a control rod extending into a shallow region of a recess.

FIGS. 4A and 4B show the user interface collar 80 from below. Each of the three lobes 82a, 82b and 82c (for a three legged version) has a cam recess 86a, 86b and 86c, respectively, relieved into the underside of the lobe 82x (x=a,b,c). In a preferred embodiment, the recess has a relatively shallow region, 88s, and a relatively deeper region 88d. These regions are also shown schematically with reference to FIG. 4C, which is a partial cross-section of the lobe 82c, showing a partial contour of the recess 86c. FIG. 4D shows this same recess 86c, with the control rod 20c, with its cam follower surface 84c, extending into the deeper portion 88d. FIG. 4E shows this same recess 86c, with the control rod 20c, with its cam follower surface 84c extending into the shallower portion 88d.

The three control rods 20a, 20b and 20c are arranged relative to the three recesses 86a, 86b and 86c such that if one control rod is extending into the deeper portion of its respective recess, then so will the other control rods be extending into their corresponding deeper recess regions. Similarly, if one is extending into the shallower region of the recess, so will the other two.

Taking the case first where the control rods are all positioned in the deeper regions 88d of the respective recesses 86, if the collar 80 is rotated around the axis V to follow the arrow R, each profiled cam recess surface 86 pushes its respective control rod generally away from the collar, as the shallower region of the recess is rotated to be adjacent the control rod cam follower surface. Essentially the control rod cam surface rides up the slope, from the deeper region 88d to the shallower region 88s. This motion of the control rod tips the corresponding jam-plate 32, from the locking position, to the unlocking position shown in FIG. 1B. Thus, there is no locking force holding the two leg components 12 and 14 relatively stationary, and they are free to move, under the influence of gravity, or pulling by the operator, or under the influence of a preload within the tube.

When the legs are at their desired relative positions, the collar is rotated back, around the axis V, against the direction of the arrow R, through a unified control motion, allowing the control rods to return to the deeper portions of the recess, under influence of the return spring 40, which allows the jam-plate to return to its jamming position, thereby locking the leg components against relative translation.

There is another way to simultaneously release all of the legs for adjustment. If the collar 80 is pushed down uniformly towards the legs, all of the 88x (x=a, b and c) surfaces will also move down. (A spring, not shown, statically supports the collar 80 a small distance above the lower limit of its travel aligned with the arrow V.) If the control rod cam follower ends were all in the shallow portion 88s of their respective recesses, then the jam-plate remains unengaged. But even if the control rod 20 cam follower ends were all in the deeper portion 88d of the recess profile, the uniform downward translation of 80 will cause all the control rods 20 to be depressed, thereby releasing all of the jam-locks. In a useful embodiment, there is room for an approximately 1.5 cm downward translation that will release the legs. A useful range for this motion is between 0.75–2 cm. This action may also be aided with a lever and a cam (not shown).

The foregoing explains simultaneous leg manipulation. It is also typically necessary to adjust one or more legs individually. For instance, a typical mode of operation would be to simultaneously release all three legs and move them to an approximate position together, and then lock them simultaneously. Then, each leg is individually moved through a smaller adjustment to the precise, desired orientation.

To unlock an individual leg, for instance the leg 10c that is associated with control rod 20c, the collar 80 is tilted through a single control motion around the axis c, toward the leg 10c. This tilt forces the control rod 20c downward, but does not force the other two control rods at all (or, if at all, not enough to change the orientation of the jam-plate). Forcing the control rod 20c downward releases the corresponding jam-plate 32, as described above, so that the upper and lower leg components of the leg 10c can be translated relative to each other. When the collar 80 is un-tilted, back to a neutral orientation, the jam-plate 32 returns to its jamming orientation, and the leg components lock together.

Each leg can thus be unlocked and adjusted individually, simply by tilting the user control collar 80 through a single control motion around the appropriate axis a, b or c, toward the leg to be adjusted. In general, an appropriate axis is one that is roughly perpendicular to an axis that is generally radial, from the center of the collar, outward toward the axis of elongation of the leg to be adjusted.

For instance, as shown in FIG. 2, tilting the collar around the axis a releases the jam-plate for the leg 10a. This axis is also located between the central axis of the collar, V and the point at which the cam follower of the control rod 20c contacts the cam recess 86c. Thus, as shown in FIG. 2, tilting the collar around the axis a releases the jam-plate for the leg 10a; tilting the collar around the axis b releases the jam-plate for the leg 10b; and tilting the collar around the axis c releases the jam-plate for the leg 10c.

Of course, there might also be situations where the user opts to adjust each leg individually, and not to adjust all of the legs simultaneously. The described inventions also make this mode of operation very simple.

The foregoing has described an apparatus where relaxation of a jam-plate in a given leg is achieved by tilting of the control collar through a single control motion toward the leg to be adjusted. A variation is, perhaps, not quite as intuitive. Instead, to achieve relaxation of a jam-plate in a given leg, the collar is tilted through a single control motion around a radial axis that is perpendicular to the axis mentioned above. For instance as shown at a' in FIGS. 2 and 3, to relax the leg 10a, nearest to the lobe 82a, the collar is tilted around the generally radial axis a'. This may not be as intuitive for some operators, as the embodiment discussed above, because the lobe is not tipped toward the leg to be adjusted, but rather is tipped around an axis that passes through the leg to be adjusted. Although perhaps not as intuitive, this variation may be easier to implement, and is still rather intuitive and can be easily learned. Either variation works equally well from a standpoint of the control rod and recess relationship.

Figure 4F:
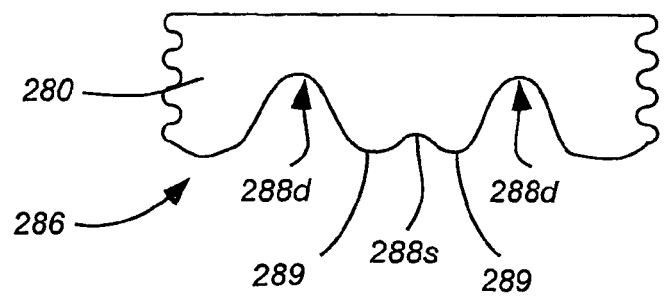
FIG. 4F shows, schematically, a recess profile in the form of a continuous wave, for use with a user control collar that can be rotated continuously in one direction.

Rather than individual pocket recess profiles 86, with two depths, it is also possible to provide a continuous wave profiled cam 286, with two major levels, with a third, border level interposed therebetween, as shown schematically in FIG. 4F. This profile 286 is continuous, around the entire circumference of the collar. In such a case, the rotational travel of the user interface collar 280 for the unified control motion need not be limited to (360° divided by the number of legs), but rather can be continuously rotated beyond 360°. Further, rather than reversing rotation to return to a locked status, rotation can simply be continued in a forward direction R, to the next deep trough 288d (or shallow trough 288s as the case may be) in the wave profile 286. The profile is thus wave-like, as shown in FIG. 4F. The deep troughs 288d correspond to the deeper portion 88*d* of the recess 86 described above, and the shallower trough 288*s* correspond to the shallower portion 88*s* of the recess 86. The small crests 289 prevent inadvertent slipping of the collar from a shallower, unlock trough 288*s* to a deeper, lock position trough 288*d* and also the reverse.

From the foregoing, it is evident that the user interface collar provides an elegant, unitary, robust way for a user to adjust the legs either simultaneously, or individually, simply by manipulating one user interface element, through simple, well-defined, operationally distinct movements. The user need not look for small latches, or move his or her hand from one locking mechanism associated with one leg, to another, associated with another leg. Nor need the user move the hand from one locking mechanism associated with a single leg, to another associated with all of the legs. Moreover, all necessary operations can be conducted with one hand, without looking. The user must simply grasp a single, relatively large, easy to blindly locate, element, and manipulate it through simple motions. The motions are, a unified control rotation motion around one axis for simultaneous deployment/collapse, and single control tilting motions around one of three individual axes for individual adjustment.

Figure 10A:
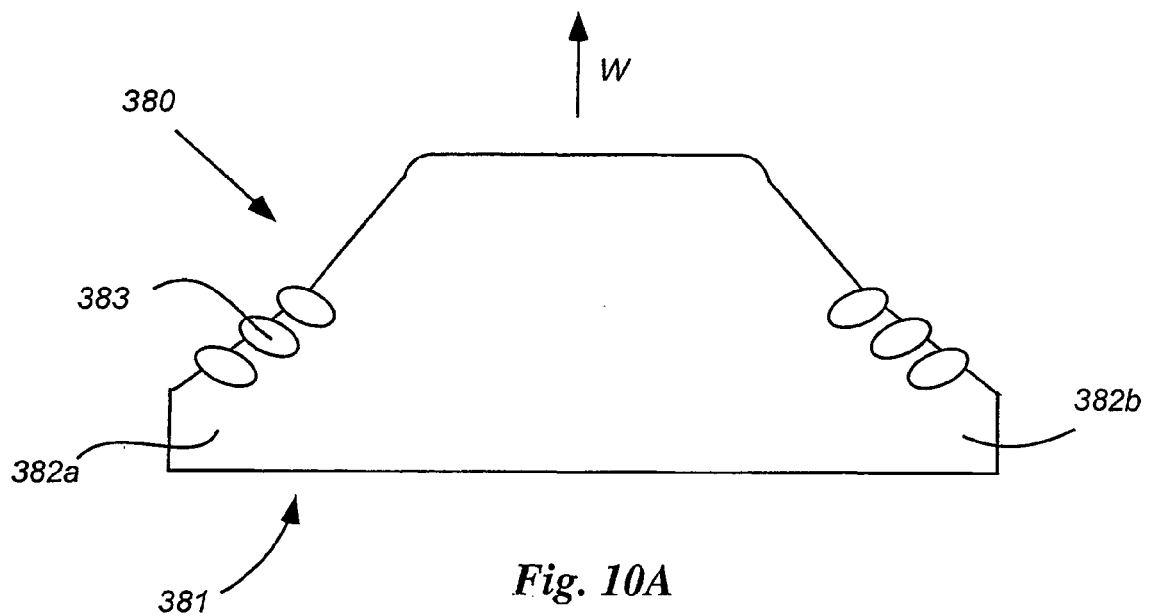
FIG. 10A shows, schematically, in an elevation view view, a relatively large volume user control collar.
Figure 10B:
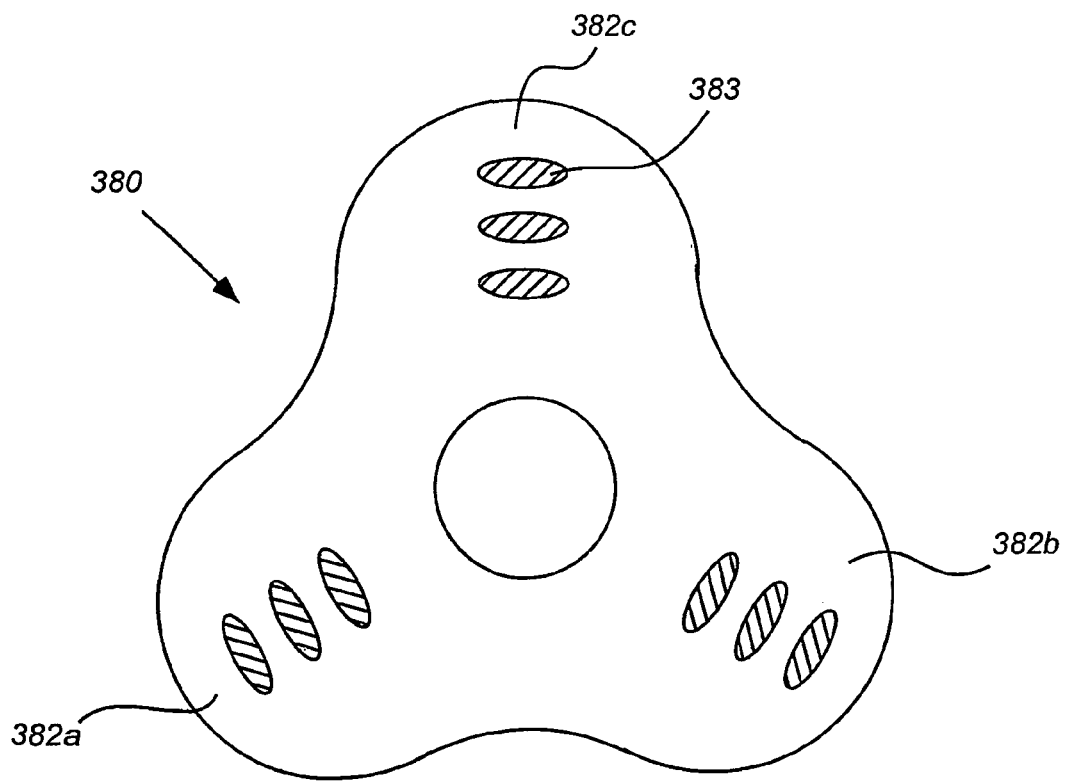
FIG. 10B shows in a top plan view the large volume collar of FIG. 10A.

Other Shapes for the User Interface. Rather than being relatively planar, as shown, the collar can be more pyramidal shaped, with its apex aligned along the axis V. Such a user interface 380 is shown schematically in FIGS. 10A and 10B. Such a collar 380 may have a part similar to the planar element 80 embedded within it, or, its under surface 381 may be identical to the undersurface 81 of the user interface collar 80 described above. However, the variation may provide more volume to provide an even larger surface for grabbing and manipulating the collar. For example, with gloved hands, the larger, more voluminous collar might be preferred. The lobes 382*a*, 382*b* and 382*c* are easily grasped. Tactile or visual indicia 383 may be provided to enhance user recognition of the lobes.

Or, rather than being continuous, its lobes can be more separated, such as radiating fingers. All that is required is that there must be a portion of the interface that is wide enough to allow space for the deep and shallow portions of the cam recess.

It will also be understood that for a tripod, rather than a lobed collar, as shown, a simple triangular collar can be used, with a vertex, or a side of the triangle, being aligned with a leg of the tripod.

The profile of the control recess can be different, as long as it permits appropriately changing the location of the push rod or other control member when the collar is rotated and tilted.

Multiple Legs, other than Tripods. Most equipment supports are tripods, or, monopods. However, in some cases, supports with more than three legs are used. For instance, some surveying equipment supports have more than three legs. The jam lock and the unitary user interface collar discussed above can be used with such stands of higher leg number. In such a case, the collar has a shape that is convenient to use with the higher number of legs. It may have a shape that provides a lobe for each leg. Or, rather than lobes, regular polygonal shapes, such as pentagons, hexagons, octagons, etc. can be used. Or, stars with the requisite number of points can be used.

Alternatively, the collar can be hemispherical, or, another smooth, regular shape. It still has the tilting and rotating capability as described above, with profiled recesses, but without the lobes. The design is intuitive enough not to require the lobes to indicate which motion adjusts which leg. Alternative to lobes, a smoothly shaped collar can have visual, or tactile indicia as indicated at 383 in FIG. 10B, located adjacent the legs, such as brightly colored marks, raised patterns, or indentations.

Figure 7:
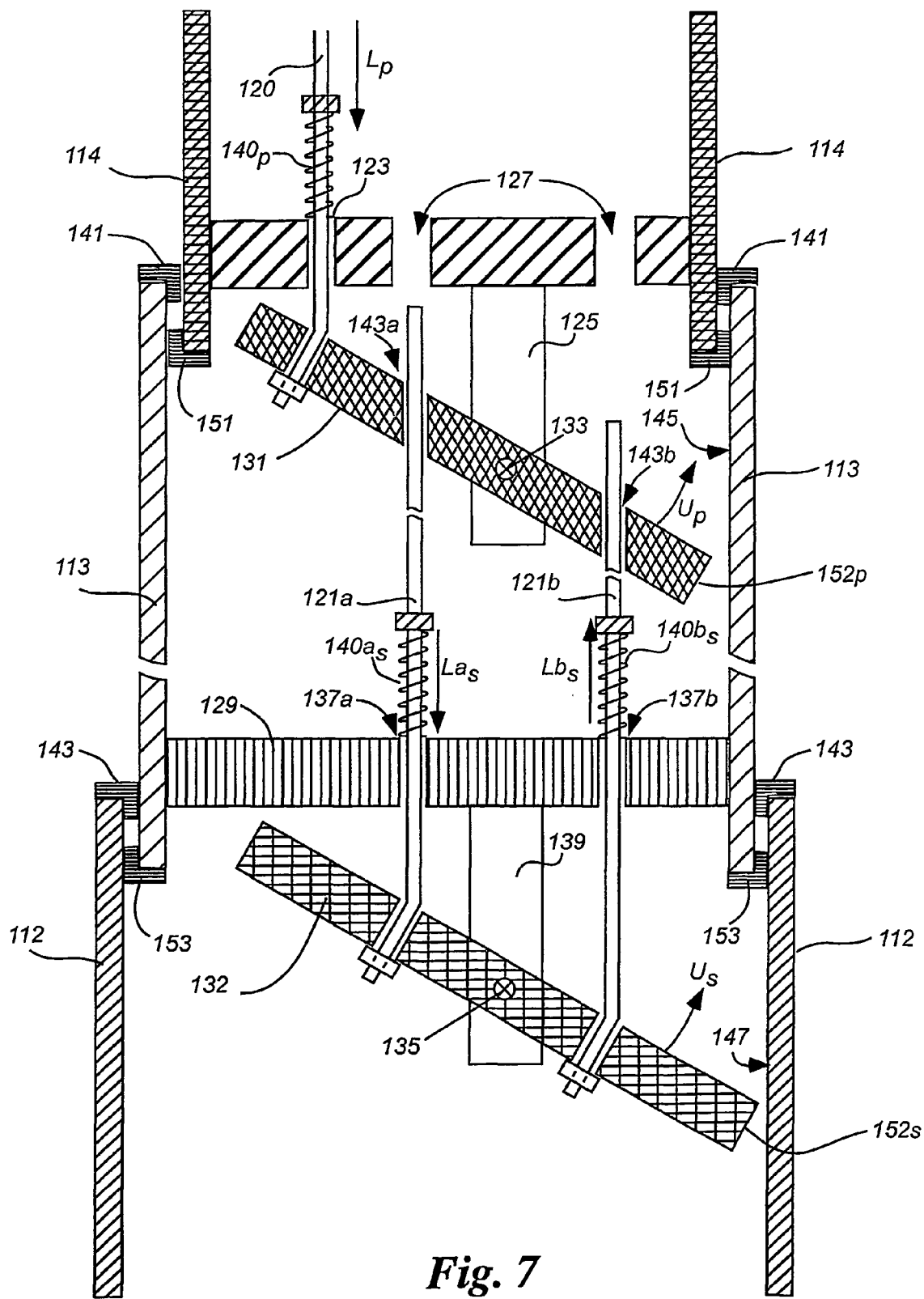
FIG. 7 shows, schematically, in cross-section, a dual jam-plate arrangement for a three component leg.

Three Leg Component Design. The foregoing discussion describes two-component legs, having an upper and a lower component. FIG. 7 shows that a similar concept can be used in connection with a three-component leg, having a middle component 113 that is between an upper 114 and a lower 112 component. Such an arrangement is shown schematically, in cross-section, in FIG. 7. For each three component leg, there are three control rods: a primary control rod 120 and a set of two secondary control rods 121*a* and 121*b*. (One of these secondary control rods is not strictly necessary, but, is for redundancy in case one of the rods slips.)

The primary control rod 120 extends to a user interface collar (not shown) in generally the same manner as does the control rod 20, described above for a two component leg. (A difference is that, as explained below, pushing the control rod 120 downward in the direction of the arrow L, (toward the jam-plates 131 and 132), locks the jam-plates, while, in the two component design discussed above, pushing the control rod 20 downward unlocks the jam-lock.

For each three component leg, there are two jam-plates: a primary jam-plate 131, and a secondary jam-plate 132. An primary support plate 127 is fixed to the lower end of the upper component 114. A secondary support plate 129 is fitted to the lower end of the intermediate leg component 113. A primary jam-plate pivot 133 is also fixed to the upper leg component 114. As shown, this primary pivot is fixed to an extension 125 of the primary support plate 127. Alternatively, it could be fixed to an extension of the upper tube component 114 itself. The pivot 133 pivotally supports the primary jam-plate 131, so that the jam-plate 131 is free to pivot around the pivot point.

The primary control rod 120 passes through an opening 123 in the primary support plate 127. The secondary control rods 121*a* and 121*b* pass through openings 137*a* and 137*b* in the secondary support plate 129. A secondary jam-plate pivot 135 is fixed to the lower, intermediate component 113. As shown, this secondary pivot is fixed to an extension 139 of the secondary support plate 129. Alternatively, it could be fixed to an extension of the intermediate tube component 113 itself. The pivot pivotally supports the secondary jam-plate 132, so that the jam-plate 132 is free to pivot around the pivot point.

An upper annular bushing 141 is fixed to the upper end of the intermediate tube component 113 and another bushing 151 at the lower end of the upper tube component 114, and permits the two tube components to slide relative to each other, with relatively little friction, or wear. The bushing is made of a low friction, wear resistant material. Similarly, bushings 143 and 153 are fixed to the upper end of the lower tube component 112 and the lower end of the intermediate tube component 113.

The configuration shown in FIG. 7 is an unlocked configuration. In this configuration, the lower tube component 112 is free to translate relative to the intermediate component 113. If it does, then it also translates relative to all of the other elements shown in FIG. 7 (except, the bushing 143, which is fixed to the lower component 112). The intermediate tube 113 is also free to translate relative to the upper tube component 114. If it does, then the secondary support plate 129 also translates, as does the pivot 135, and the secondary jam-plate 132, as well as the secondary control rods 121*a* and 121*b*. The control rods 121*a* and 121*b* are free to translate relative to the primary jam plate 131 and the upper tube component 114, because the secondary control rods pass freely through the openings 143a and 143b in the primary jam-plate 131.

To lock the jam-plates, the user pushes the primary control rod 120 downward (toward the jam-plates), by means of a collar, similar to that described above, with profiled recesses. Pushing down on the primary control rod 120 in the direction of the arrow $L_p$ pushes downward on one side of the primary jam-plate 131, relative to the primary pivot 133, causing the primary jam-plate to pivot around the pivot point 133, counter-clockwise, as shown. This causes the other side of the primary jam plate to move upward, relative to the pivot point 133, as indicated by the arrow $U_p$. Moving upward, the edge $_{152p}$ of the primary jam-plate 131 eventually contacts the inner surface 145 of the intermediate leg component 113, causing a jam-lock, as described above.

The flow of force is from the intermediate component 113 sidewall 145 to the edge $152_p$ of the primary jam-plate 131, through the pivot point 133, to the upper tube component 114 through either the extension 125 of the primary support plate 127, and the support plate itself, or, through an extension of the upper tube component 114 (not shown for this variation).

Tilting of the primary jam-plate (in a counterclockwise direction, as shown) eventually tilts enough to trap the secondary control rods 121a and 121b in the openings 143a and 143b of the primary jam-plate 131, which then drives the secondary control rods 121a and 121b along the directions of the arrows $La_s$ and $Lb_s$ respectively, shown, to also tilt the secondary jam-plate 132 around the pivot point 135 in a counter-clockwise direction, as shown. This tilting of the secondary jam plate 132 also causes it's edge $152_s$ to tilt upward following the arrow $U_s$ so that the secondary jam-plate 132 jams against the inner surface 147 of the lower tube component 112, thereby jam locking against it.

The clearance between the secondary control rods 121a and 121b and the primary jam-plate 131 must be large enough to permit the control rods to slide through when the leg components are being collapsed, but also small enough to ensure that when the primary control rod 120 is depressed, the secondary control rods are captured by the tilted jam-plate 131 and thus non-parallel channels 143a and 143b, with enough friction to be pushed and pulled as indicated, to tilt and jam the lower jam-plate 132.)

Thus, it is again the case that the jam-lock prevents the leg components from collapsing to a closed configuration, under the influence of a load upon the legs as would be generated by equipment supported at the upper end, with the lower legs resting on the ground. Such a load tends to further jam the jam-plates 131 and 132 into a jamming configuration, and thus, to lock them more securely.

The leg is locked by pushing the primary control rod 120 downward. This is accomplished in the same manner as described above, with a cam follower surface at the upper end of the primary control rod 120, and a profiled recess under a user interface collar. When forced into a shallower portion of a cam profile, the rod is forced downward, and causes the jamming action. (It should be noted that the embodiments discussed above effect unlocking, with pushing the control rod, while this embodiment effect locking, with pushing of a control rod.)

To unlock the jam-plates, the collar is turned so that the cam follower is adjacent a deeper region of the cam profile, so that the control rod 120 is free to snap back into the deeper region. The primary control rod is urged to snap back in that direction (against the arrow $L_p$ as shown in FIG. 7) under influence of the primary return spring $140_p$ and secondary return springs $140_{sa}$ and $140_{sb}$.

Thus, both the primary and the secondary jam-plates are locked, and unlocked substantially simultaneously. Thus, a leg can be completely extended, or collapsed when the jam-plates are in the unlocked configuration.

Further, to adjust a single leg, a similar action can be applied as used with the two-component design discussed above. However, in this case, the collar is tilted away from the leg to be adjusted, rather than toward it. In other words, the portion of the collar adjacent the leg to be adjusted is tilted upward, and downward opposite it, between the other two legs to be left unadjusted. This also puts additional downward pressure on the two primary control rods associated with the two legs that are not to be adjusted. In that case, the collar has a form that facilitates lifting upward. The lobes shown certainly are equally suitable for lifting upward as for pushing downward. Other shapes are also suitable.

In this embodiment, the support functions and the bearing functions are entirely separate. The support functions are taken by the primary and secondary supports 131 and 132, and the bearing functions are taken by the bushings 141, 143, 151 and 153.

When the components of this three-component leg design are collapsed, they form a relatively compact package. The lower component 112 fits entirely around the intermediate component 113. The intermediate component walls fit around the walls of the upper component 114. The primary jam-plate is substantially fixed relative to the upper component, except for its freedom to tilt. Thus, when the unit is collapsed, the primary jam-plate 131 remains relatively fixed. The secondary jam-plate 132 and the secondary support 129 are substantially fixed relative to the intermediate component 113, and as it moves upward, toward the upward component 114, so do they. Similarly the secondary control rods 121a and 121b move with the secondary jam-plate 132, and thus, with the intermediate component 113. Their upper ends pass through channels in the upper support 127.

Additional Embodiments. Rather than push rods, spring loaded tension elements such as cables, or straps, that are pulled, rather than pushed, may be used. In such a case, typically, an upward tipping motion would release the lock, rather than a downward pushing motion. Such devices could be lighter than those with push rods, as the tension elements could be made of material that is lighter than that used for compression bearing, pushable control rods. Thus, when the term control member is used herein, it is used to mean any such control member, which can be pushed, like a rod, or pulled, like a cable.

In very rare cases, an equipment support might be suspended from an overhead support, rather than being supported by the ground, or other grounded fixture. In that case, the support would hang from the leg or legs, and the equipment would hang from the shoulder, rather than bearing down upon it. The inventions disclosed herein can be used in that context. However, the orientation of the jam-plate must be reversed, because it must oppose a force that would tend to separate the multiple leg components from each other. In the conventional configuration, described above, the jam-plate is arranged to resist a force that would tend to collapse the multiple leg components toward each other. It is also possible to provide equipment with removable jam-plate cartridges, which can be reversed, to use in the inverted configuration, or swapped with an inverted orientation jam-plate cartridge. Or, dual jam-plates can be used, one of which is configured to be active only when the load is applied to compress the leg-components, and the other to be active only when the load is applied to extend the leg-components.

Many techniques and aspects of the inventions have been described herein. The person skilled in the art will understand that many of these techniques can be used with other disclosed techniques, even if they have not been specifically described in use together.

This disclosure describes and discloses more than one invention. The inventions are set forth in the claims of this and related documents, not only as filed, but also as developed during prosecution of any patent application based on this disclosure. The inventors intend to claim all of the various inventions to the limits permitted by the prior art, as it is subsequently determined to be. No feature described herein is essential to each invention discloed herein, but not claimed in any particular claim of any patent based on this disclosure, should be incorporated into ant such claim.

Some assemblies of hardware, or groups of steps, are referred to herein as an invention. However, this is not an admission that any such assemblies or groups are necessarily patentably distinct inventions, particularly as contemplated by laws and regulations regarding the number of inventions that will be examined in one patent application, or unity of invention. It is intended to be a short way of saying an embodiment of an invention.

An abstract is submitted herewith. It is emphasized that this abstract is being provided to comply with the rule requiring an abstract that will allow examiners and other searchers to quickly ascertain the subject matter of the technical disclosure. It is submitted with the understanding that it will not be used to interpret or limit the scope or meaning of the claims, as promised by the Patent Office's rule.

The foregoing discussion should be understood as illustrative and should not be considered to be limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or step plus function elements in the claims below are intended to include any structure, material, or acts for performing the functions in combination with other claimed elements as specifically claimed.

What is claimed is:

1. A multi-legged equipment stand comprising:
   a. a shoulder bracket;
   b. coupled to said shoulder bracket, a plurality of telescoping, elongated legs, each leg having an uppermost elongated component and a lower elongated component, said uppermost and lower components being elongated along an axis of elongation, said uppermost elongated component being translationally fixed relative to said shoulder bracket, and said lower elongated component being translatable relative to said shoulder bracket and said uppermost component, along said axis of elongation, said uppermost component having a shoulder end, and a ground end, said lower component having a shoulder end and a ground end, said shoulder end of said uppermost and lower components being located nearer to said shoulder bracket than said ground end of said respective components;
   c. for each pair of uppermost and lower components of a leg, a releasable lock that engages both said uppermost and lower components, said lock being movable from a locking configuration that contacts both of said uppermost and lower components and locks them to prevent relative translation thereof, to a non-locking configuration, in which said components are substantially freely translatable relative to each other;
   d. coupled to each of said lock, a control rod, which extends from said lock, along said uppermost elongated component to adjacent said shoulder bracket, terminating in a cam follower surface, and which rod is coupled to said lock to selectively lock or unlock said lock if said control rod is moved;
   e. a user interface element, supported by said shoulder bracket, adjacent said cam follower surfaces of said plurality of control rods, said user interface element comprising a profiled cam recess surface;
   f. a couple between said shoulder bracket and said user interface collar, which partially restrains said user interface element such that:
      i. a unified control motion of said user interface element relative to said support simultaneously moves all of said control rods so that all of said locks are unlocked;
      ii. a first single control motion of said user interface element relative to said shoulder bracket moves only a first one of said control rods so that a corresponding one of said locks is unlocked, while simultaneously, all others of said locks are unaffected with respect to their respective lock state; and
      iii. a second single control motion of said user interface element relative to said shoulder bracket moves only a different, second one of said control rods so that a corresponding one of said locks is unlocked, while simultaneously, all others of said locks are unaffected with respect to their respective lock state.

2. The equipment stand of claim 1, said plurality of legs comprising three.

3. The equipment stand of claim 1, said lock comprising a spring loaded jam-plate.

4. The equipment stand of claim 3, said uppermost and lower elongated leg components comprising hollow tubes, with said lower component arranged concentric with and outside of said uppermost component, said jam-plate arranged to jam against an inner surface of said lower elongated component and against said uppermost elongated component.

5. The equipment stand of claim 4, said jam-plate arranged to jam against an inner surface of said uppermost elongated component.

6. The equipment stand of claim 4, further comprising a support bushing fixed to said ground end of said uppermost leg component, said jam-plate arranged to jam against said uppermost elongated component by jamming against said support bushing.

7. The equipment stand of claim 6, said jam-plate comprising a hinged jam-plate that is hinged to said support bushing.

8. The equipment stand of claim 7, said hinged jam-plate comprising a pinned hinge.

9. The equipment stand of claim 7, said hinged jam-plate comprising a living hinge.

10. The equipment stand of claim 6, said support bushing having a slotted surface, said jam-plate comprising a plate having an edge with a tab that is sized and shaped to fit within said slot.

11. The equipment stand of claim 3, said uppermost and lower elongated leg components comprising hollow tubes, with said lower component arranged concentric with and outside of said uppermost component, said jam-plate arranged to apply a force that has a radially outward component against each of an inner surface of said uppermost leg component and an inner surface of said lower leg component.

12. The equipment stand of claim 11, said inner surfaces of said upper most leg component and of said lower leg component being arranged generally facing each other.

13. The equipment stand of claim 3, said uppermost and lower elongated leg components comprising hollow tubes, with said lower component arranged concentric with and outside of said uppermost component, said control rod comprising a rod that passes along the inside of both said uppermost and lower hollow tube components.

14. The equipment stand of claim 3, said user interface element comprising, a profiled cam surface shaped to simultaneously force each of said control rods away from said user interface element if said user interface element is rotated around said unified control axis, and, individually force a single control rod away from said user interface element if said user interface element is tilted around a single control axis associated with said respective single control rod.

15. The equipment stand of claim 14, said cam profile surfaces comprising, for each control rod, a two level well, with a sloped profiled region joining said two levels.

16. The equipment stand of claim 14, said cam profile surface comprising, a continuous 360° wave profile having at least two levels in a repeating pattern around the circumference of the user control element.

17. The equipment stand of claim 1, said user interface element comprising a collar, said unified control motion comprising rotation around a unified control axis, said first single control motion comprising tilt around a first, single control axis and said second single control motion comprising tilt around a second, single control axis.

18. The equipment stand of claim 17, said single control axes lying in a plane that is perpendicular to said unified control axis.

19. The equipment stand of claim 1, said leg components comprising cylindrical tubes, and said lock comprising a jam-plate having at least one arcuate curved edge.

20. The equipment stand of claim 1, said plurality of legs comprising three legs, said user interface element comprising a unitary, three-lobed collar, which controls both unified motion of said control rods, and single control motion of said control rods.

21. The equipment stand of claim 20, said three lobed collar comprising a substantially planar collar.

22. The equipment stand of claim 20, said three lobed collar comprising a substantially dome shaped collar.

23. The equipment stand of claim 1, said unified control motion comprising a motion that substantially simultaneously forces said control rods toward said ground ends of said legs.

24. The equipment stand of claim 1, said first single control motion comprising a motion that forces said respective control rod toward said ground end of said legs.

25. The equipment stand of claim 1, said unified control motion comprising a motion that substantially simultaneously forces said control rods toward said shoulder ends of said legs.

26. The equipment stand of claim 1, said single control motion comprising a motion that forces said respective control rod toward said shoulder end of said legs.

27. A multi-legged equipment stand comprising:
a. a shoulder bracket;
b. coupled to said shoulder bracket, a plurality of telescoping, elongated legs, each leg having an uppermost elongated component and a lower elongated component, said uppermost and lower components being elongated along an axis of elongation, said uppermost elongated component being translationally fixed relative to said shoulder bracket, and said lower elongated component being translatable relative to said shoulder bracket and said uppermost component, along said axis of elongation, said uppermost component having a shoulder end, and a ground end, said lower component having a shoulder end and a ground end, said shoulder end of said uppermost and lower components being located nearer to said shoulder bracket than said ground end of said respective components;
c. for each pair of uppermost and lower components of a leg, a releasable lock that engages both said uppermost and lower components, said lock being movable from a locking configuration that contacts both of said uppermost and lower components and locks them to prevent relative translation thereof, to a non-locking configuration, in which said components are substantially freely translatable relative to each other;
d. coupled to each of said lock, a control member, which extends from said lock, along said uppermost elongated component to adjacent said shoulder bracket, terminating in a control component;
e. a user interface element, supported by said shoulder bracket, adjacent said control components of said plurality of control members, said user interface element comprising, for each of said control components, a control activation element and which control member is coupled to said lock to selectively lock or unlock said lock if said control mechanism is moved;
f. a couple between said shoulder bracket and said user interface element, which partially restrains said user interface element such that:
  i. a unified control motion of said user interface element relative to said support simultaneously moves all of said control members so that all of said locks are unlocked;
  ii. a first single control motion of said user interface element relative to said shoulder bracket moves only a first one of said control members so that a corresponding one of said locks is unlocked, while simultaneously, all others of said locks are unaffected with respect to their respective lock state; and
  iii. a second single control motion of said user interface element relative to said shoulder bracket moves only a different, second one of said control members so that a corresponding one of said locks is unlocked, while simultaneously, all others of said locks are unaffected with respect to their respective lock state.

28. The equipment stand of claim 27, said control member comprising a rod that is capable of bearing compression and tension.

29. The equipment stand of claim 27, said control member comprising a cable that is capable of bearing tension.

30. The equipment stand of claim 27, said control member comprising a linkage that is capable of bearing compression.

31. The equipment stand of claim 27, said control member comprising a linkage that is capable of bearing tension.

32. The equipment stand of claim 27, said couple between said shoulder bracket and said user interface element, partially restraining said user interface element such that said first single control motion of said user interface element relative to said shoulder bracket moves only a first one of said control members so that a corresponding one of said locks is unlocked, while simultaneously, all others of said locks remain locked.

33. An equipment stand comprising:
   a. at least three telescoping legs, each leg comprising at least two telescoping components;
   b. a single, unitary control user contact member, operative to selectively perform one of the following release functions:
      i. release all of said legs for telescoping adjustment between said at least two telescoping components; and
      ii. release only a selected one of said legs for telescoping adjustment between said at least two telescoping components of said one leg, while, simultaneously maintaining all others of said legs locked against adjustment between said at least two telescoping components of said other legs.

34. The equipment stand of claim 33, said stand comprising a tripod.

35. The equipment stand of claim 34, said legs comprising open sided telescoping channel elements.

36. The equipment stand of claim 33, said legs comprising telescoping cylindrical tube.

37. The equipment stand of claim 36, said cylindrical tubes comprising circular cylinders.

38. The equipment stand of claim 33 further comprising, for each leg, a lock and a control linkage, said lock operative to selectively lock said two telescoping components against relative motion, and to free them for relative motion, and said control linkage arranged to couple said lock to said user contact member.

39. The equipment stand of claim 33, said unitary control user contact member comprising a collar, that is rotatable around a unified motion axis to release all of said legs for telescoping adjustment.

40. The equipment stand of claim 39, said collar being further tiltable around:
   a. a first single motion axis to release a first of said legs for telescoping adjustment;
   b. a second single motion axis to release a second of said legs for telescoping adjustment; and
   c. a third single motion axis to release a third of said legs for telescoping adjustment.

41. The equipment stand of claim 40, said first and second single motion axes intersecting at a first intersection point, said second and third single motion axes intersecting at a second intersection point, and said third and first single motion axes intersecting at a third intersection point, said first, second and third intersection points forming vertices of a triangle having a centroid through which said unified motion axis runs.

42. The equipment stand of claim 40, said first, second and third single motion axes all intersecting at a single point.

43. A locking telescoping leg mechanism, comprising:
   a. an uppermost elongated hollow tubular leg component, having an inside surface and an outside surface; and
   b. a lower elongated leg component, having an inside surface and an outside surface, said uppermost and lower components being elongated along an axis of elongation, said uppermost and lower elongated leg components being translatable relative to each other, along said axis of elongation, said uppermost component having a shoulder end, and a ground end, said lower component having a shoulder end and a ground end, said shoulder end of said lower component being located nearer to said shoulder end of said uppermost component than is said ground end of said lower component;
   c. a releasable jam-plate that engages both said uppermost and lower components, said jam-plate being movable between:
      i. a locking configuration that applies a generally radially outward force to:
         A. said inside surface of said uppermost component; and
         B. said inside surface of said lower component; and
      ii. a non-locking configuration, in which at least one of said radial outward forces is so small that said components are substantially freely movable relative to each other; and
   d. coupled to said jam-plate, a control member, which extends from said jam-plate, inside said uppermost elongated component through substantially its entire length, to adjacent said shoulder end, terminating in a shoulder end, said control member being coupled to said jam-plate such that motion of said control member moves said jam-plate from said locking configuration to said non-locking configuration.

44. The leg of claim 43, further comprising, coupled to said control member, a spring, which forces said control member toward a rest position, which corresponds to said locking configuration of said jam-plate.

45. The leg of claim 44, said inside surface of said uppermost component said inside surface of said lower component comprising generally facing surfaces.

46. The leg of claim 45, one of said inside surface of said uppermost component said inside surface of said lower component comprising a surface of an axially assymetric extension of said respective leg component.

47. The leg of claim 44, said jam-plate arranged such that in said locking configuration, said jam-plate constitutes a portion of a continuous force path from said lower elongated leg component to said upper elongated leg component.

48. The leg of claim 43, said jam-plate arranged relative to said upper leg component to apply a force directly to said upper component when said jam-plate is in said locking configuration.

49. The leg of claim 43, further comprising, secured to said ground end of said upper leg component, a jam-plate support, said jam-plate arranged relative to said support and said upper leg component to apply a force indirectly to said upper leg component when said jam-plate is in said locking configuration, by applying a force directly to said jam-plate support.

50. The leg of claim 49, said jam-plate support comprising a support bushing.

51. The leg of claim 49, said jam-plate support comprising a surface with a slot, and said jam-plate comprising a plate having an edge that is sized and shaped to fit into said slot.

52. The leg of claim 49, said jam-plate support comprising a bushing with a support surface.

53. The leg of claim 44, said jam-plate arranged such that in said non-locking configuration, said jam-plate is moved such that said force path from said lower elongated leg component to said upper elongated leg component is discontinuous at said jam-plate.

* * * * *